(12) United States Patent
Axinte et al.

(10) Patent No.: US 10,213,919 B2
(45) Date of Patent: Feb. 26, 2019

(54) FLEXIBLE TOOLS AND APPARATUS FOR MACHINING OBJECTS

(71) Applicant: ROLLS-ROYCE PLC, London (GB)

(72) Inventors: Dragos Aurelian Axinte, Nottingham (GB); Xin Dong, Nottingham (GB); Mark Hugh Raffles, Nottingham (GB); Adam Nagy, Loughborough (GB); James Kell, Nottingham (GB)

(73) Assignee: ROLLS-ROYCE plc, London (GB)

( * ) Notice: Subject to any disclaimer, the term of this patent is extended or adjusted under 35 U.S.C. 154(b) by 446 days.

(21) Appl. No.: 15/062,938

(22) Filed: Mar. 7, 2016

(65) Prior Publication Data

US 2016/0279789 A1    Sep. 29, 2016

(30) Foreign Application Priority Data

Mar. 23, 2015   (GB) .................................... 1504843.2

(51) Int. Cl.
   *B25J 9/00*   (2006.01)
   *B25J 9/06*   (2006.01)
   *B25J 9/10*   (2006.01)
   *B25J 9/16*   (2006.01)

(52) U.S. Cl.
   CPC ............... *B25J 9/065* (2013.01); *B25J 9/104* (2013.01); *B25J 9/1676* (2013.01)

(58) Field of Classification Search
   CPC ........... B25J 9/065; B25J 9/104; B25J 9/1676
   See application file for complete search history.

(56) References Cited

U.S. PATENT DOCUMENTS

| 5,005,558 A | * | 4/1991 | Aomori | A61B 1/0055 600/141 |
| 5,297,443 A | | 3/1994 | Wentz | |
| 6,773,327 B1 | * | 8/2004 | Felice | A63H 13/02 446/330 |
| 6,858,005 B2 | * | 2/2005 | Ohline | A61B 1/0053 600/139 |

(Continued)

FOREIGN PATENT DOCUMENTS

| DE | 102010034345 A1 | 2/2012 |
| EP | 2431140 A1 | 3/2012 |
| EP | 2810745 A1 | 12/2014 |
| WO | 01/051259 A2 | 7/2001 |

OTHER PUBLICATIONS

Sep. 15, 2015 Search Report issued in British Patent Application No. 1504843.2.

(Continued)

*Primary Examiner* — David M Fenstermacher
(74) *Attorney, Agent, or Firm* — Oliff PLC

(57) ABSTRACT

A flexible tool comprising: a plurality of rigid members spaced along a longitudinal axis; a plurality of flexible members extending between the plurality of rigid members and being arranged to enable the plurality of rigid members to diverge from the longitudinal axis and define a work volume for the flexible tool, at least some of the plurality of flexible members being unevenly spaced around the longitudinal axis, and/or a physical characteristic of at least some of the plurality of flexible members varying along the longitudinal axis, to cause the work volume and/or stiffness of the flexible tool to be asymmetric relative to the longitudinal axis.

15 Claims, 13 Drawing Sheets

(56) References Cited

U.S. PATENT DOCUMENTS

| | | | |
|---|---|---|---|
| 7,090,637 B2* | 8/2006 | Danitz | A61B 1/0055 600/141 |
| 7,678,117 B2* | 3/2010 | Hinman | A61B 1/0055 606/108 |
| 8,069,747 B2* | 12/2011 | Buckingham | B25J 9/06 74/490.04 |
| 8,182,418 B2* | 5/2012 | Durant | A61B 1/0055 600/141 |
| 9,220,398 B2* | 12/2015 | Woodley | A61B 1/0053 |
| 9,393,000 B2* | 7/2016 | Donhowe | A61B 17/00 |
| 9,770,160 B2* | 9/2017 | Okaniwa | A61B 1/00009 |
| 9,919,434 B1* | 3/2018 | Rey | B25J 9/0075 |
| 9,981,392 B2* | 5/2018 | Kim | B25J 18/06 |
| 10,022,877 B2* | 7/2018 | Wang | B25J 18/025 |
| 2004/0195988 A1 | 10/2004 | Buckingham et al. | |
| 2007/0233040 A1 | 10/2007 | Macnamara et al. | |
| 2009/0012648 A1 | 1/2009 | Buckingham et al. | |
| 2009/0314119 A1 | 12/2009 | Knoll | |
| 2013/0312564 A1 | 11/2013 | Kim et al. | |
| 2014/0055596 A1 | 2/2014 | Hatcher, Jr. et al. | |

OTHER PUBLICATIONS

Xu, Kai et al. "Actuation Compensation for Flexible Surgical Snake-like Robots with Redundant Remote Actuation." Proceedings of the 2006 IEEE International Conference on Robotics and Automation, Orlando, Florida, May 2006; pp. 1148-4154.

Dario, Paolo et al. "A Novel Mechatronic Tool for Computer-Assisted Arthroscopy" IEEE Transactions on Information Technology in Biomedicine, vol. 4, No. 1, Mar. 2000, pp. 15-29.

Neppalli, Srinivas et al. "Design, Construction, and Analysis of a Continuum Robot" Proceedings of the 2007 IEEE/RSJ International Conference on Intelligent Robots Systems, San Diego, CA, Oct. 29-Nov. 2, 2007, pp. 1503-1507.

Simmaan Nabil, "Snake-Like Units Using Flexible Backbones and Actuation Redundancy for Enhanced Miniaturization" Proceedings of the 2005 IEEE International Conference on Robotics and Automation, Barcelona, Spain, Apr. 2005; pp. 3012-3017.

Sep. 7, 2016 Search Report issued in European Patent Application No. 16158776.

* cited by examiner

FLEXIBLE TOOLS AND APPARATUS FOR MACHINING OBJECTS

TECHNOLOGICAL FIELD

The present disclosure concerns flexible tools and apparatus for machining objects.

BACKGROUND

Flexible tools (which for some examples may be referred to as 'snake-arm robots') may be used to perform inspections and machining in hazardous or confined spaces. For example, such flexible tools may be used where the nature of the space or the presence of obstructions means that there is no line-of-sight access to the region of interest within the space. Such confined spaces exist in many different systems, across a wide range of technologies, for example in nuclear engineering, aircraft, gas turbine engines, industrial plants, shipbuilding, buildings, roads and pipelines.

Flexible tools have a 'work volume' that may be defined as the volume through which the end of the flexible tool may move. In some systems, the work volume of a flexible tool may be insufficient to machine or inspect a desired object. For example, the work volume of a flexible tool may extend forty five degrees about a longitudinal axis of the flexible tool. Where a desired object to be machined or inspected is positioned beyond forty five degrees, the flexible tool may not be able to reach the desired object. In such circumstances, it may be necessary to disassemble the system to enable machining or inspection of the object. Such disassembly may be relatively time consuming and costly for the owner of the system.

BRIEF SUMMARY

According to various examples there is provided a flexible tool comprising: a plurality of rigid members spaced along a longitudinal axis; a plurality of flexible members extending between the plurality of rigid members and being arranged to enable the plurality of rigid members to diverge from the longitudinal axis and define a work volume for the flexible tool, at least some of the plurality of flexible members being unevenly spaced around the longitudinal axis, and/or a physical characteristic of at least some of the plurality of flexible members varying along the longitudinal axis, to cause the work volume and/or stiffness of the flexible tool to be asymmetric relative to the longitudinal axis.

The plurality of flexible members may include a plurality of control cables that extend through at least some of the plurality of rigid members.

The plurality of control cables may include a first control cable, a second control cable, and a third control cable extending between at least two adjacent rigid members. The second control cable may be positioned between the first control cable and the third control cable. The distance between the first control cable and the second control cable may be less than the distance between the second control cable and the third control cable.

The plurality of control cables may include at least one control cable being positioned at a greater radial distance from the longitudinal axis than the other control cables of the plurality of control cables.

The plurality of flexible members may include a plurality of flexible joints that extend between adjacent rigid members of the plurality of rigid members.

The plurality of flexible joints may include a first flexible joint, a second flexible joint and a third flexible joint. The second flexible joint may be positioned between the first flexible joint and the third flexible joint. The distance between the first flexible joint and the second flexible joint may be less than the distance between the second flexible joint and the third flexible joint.

Two flexible joints of the plurality of flexible joints may extend between two adjacent rigid members and define a pivot axis there between. The pivot axis may not intersect with the axis.

The plurality of rigid members may include a first rigid member, a second rigid member and a third rigid member. The second rigid member may be positioned between the first rigid member and the third rigid member. The plurality of flexible joints may include a first subset of flexible joints extending between the first rigid member and the second rigid member, and a second subset of flexible joints extending between the second rigid member and the third rigid member. The first subset of flexible joints and the second subset of flexible joints may be overlaying one another when viewed along the longitudinal axis.

The physical characteristic of the plurality of flexible members may include length of the plurality of flexible members between adjacent rigid members.

The physical characteristic of the plurality of flexible members may include thickness of the plurality of flexible members.

The physical characteristic of the plurality of flexible members may include material of the flexible members.

According to various examples there is provided apparatus for machining an object, the apparatus comprising: a first flexible tool as described in any of the preceding paragraphs.

The apparatus may comprise: a first base; a second base. The first base and the second base may be rotatably coupled to one another. The first flexible tool may be mounted on the first base.

The apparatus may further comprise: one or more support members to support the object. The one or more support members may be mounted on the second base.

The apparatus may comprise: a second flexible tool as described in any of the preceding paragraphs; and a controller to determine the relative positions of the first flexible tool and the second flexible tool; and to control the movement of the first flexible tool and/or the second flexible tool to avoid collision there between.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
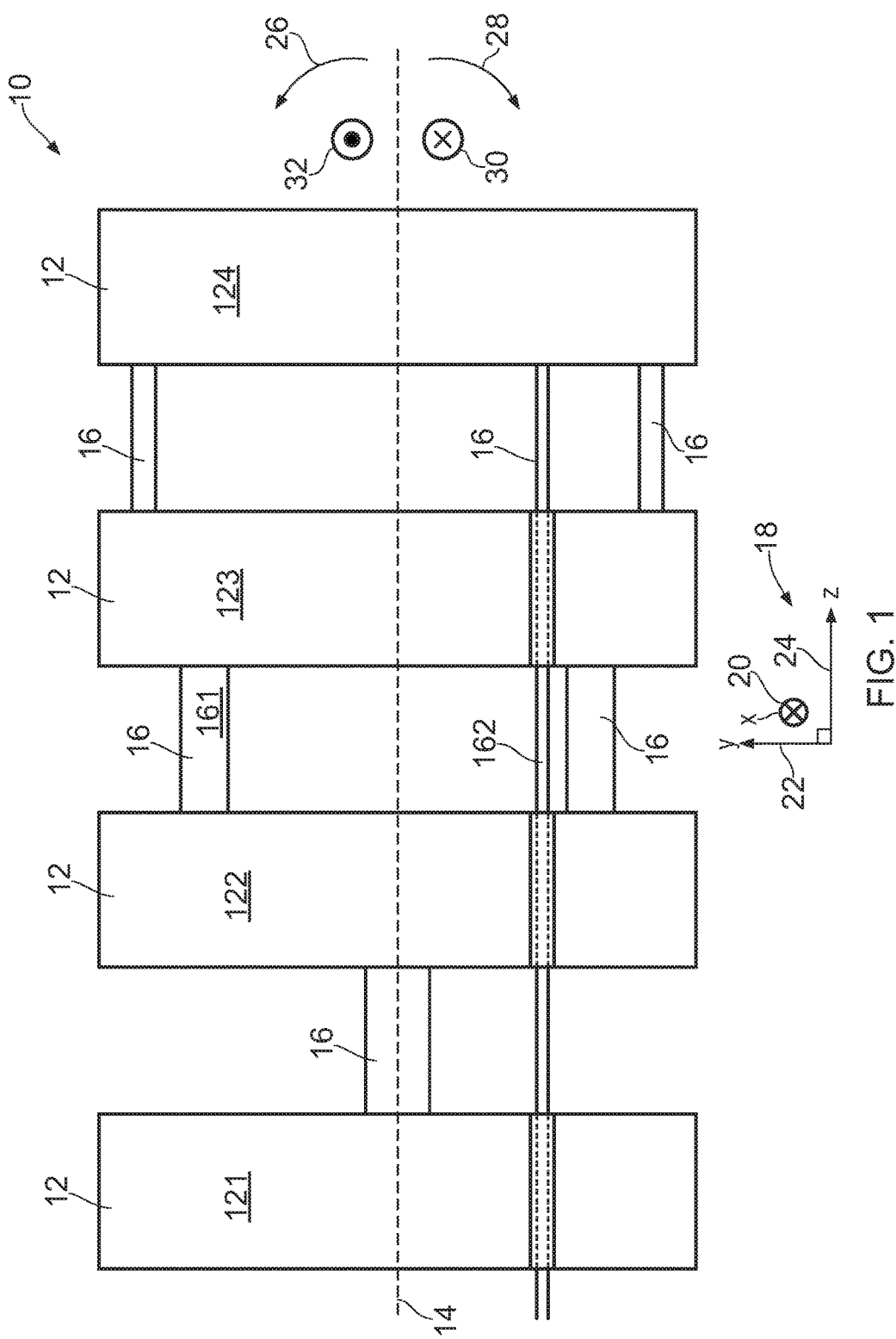
FIG. 1 illustrates a schematic side view of a flexible tool according to various examples.

FIG. 1 illustrates a flexible tool 10 comprising: a plurality of rigid members 12 spaced along a longitudinal axis 14; and a plurality of flexible members 16 extending between the plurality of rigid members 12. In some examples, the flexible tool 10 may be referred to as a 'snake-arm robot'. The flexible tool 10 may be used to machine or inspect objects in a system. For example, the flexible tool 10 may be inserted through a borescope hole of a gas turbine engine to inspect or machine a blade or a vane within the gas turbine engine.

FIG. 1 also illustrates a Cartesian coordinate system 18 including an X axis 20 (that is oriented into the page), a Y axis 22 and a Z axis 24. The X axis 20, the Y axis 22 and the Z axis 24 are orthogonal to one another. The Z axis 24 is oriented parallel to the longitudinal axis 14.

The plurality of rigid members 12 may have any suitable shape and may comprise any material that is rigid relative to the plurality of flexible members 16. For example, the plurality of rigid members 12 may have a circular cross sectional shape and comprise a metal (such as stainless steel, aluminium, titanium) or a polymer (such as Nylon, Resin, Polymorph). In other examples, the plurality of rigid members 12 may have a square, rectangular, or elliptical cross sectional shape. In some examples, the plurality of rigid members 12 may have different shapes to one another (for example, one or more rigid members in a flexible tool 10 may have a circular cross section, and one or more rigid members in the same flexible tool 10 may have a square cross section).

As illustrated in FIG. 1, the flexible tool 10 includes a first rigid member 121, a second rigid member 122, a third rigid member 123, and a fourth rigid member 124. The first rigid member 121 defines a first end of the flexible tool 10 and the fourth rigid member 124 defines a second end of the flexible tool 10. The second rigid member 122 is positioned between the first rigid member 121 and the third rigid member 123. The third rigid member 123 is positioned between the second rigid member 122 and the fourth rigid member 124.

The first rigid member 121 may be coupled to an actuator (not illustrated in FIG. 1) that is arranged to control movement of the flexible tool 10. The fourth rigid member 124 may be coupled to a machine tool (such as a blending tool, a water jet, a laser cutter, a gripper, or a drilling tool) or to a sensor (such as a charge coupled device (CCD) camera, a complementary metal oxide sensor (CMOS) camera) It should be appreciated that in other examples, the plurality of rigid members 12 may include more or less than four rigid members.

The longitudinal axis 14 may be defined as a straight line that extends through the centres of the plurality of rigid members 12 when the rigid members 12 are aligned with one another (as illustrated in FIG. 1). Additionally or alternatively, the longitudinal axis 14 may be defined as a straight line that extends in a straight line from a rigid member that defines the end of the flexible tool 10 (such as the first rigid member 121). Additionally or alternatively, the longitudinal axis 14 may be defined as a straight line that extends through the centre of the flexible tool 10 when the flexible tool 10 is straight.

The plurality of flexible members 16 includes a plurality of flexible joints that interconnect adjacent rigid members 12. For example, the flexible joint 161 interconnects the second rigid member 122 and the third rigid member 123. The flexible joints may be connected to the rigid members via a fastener (such as a screw) or via an adhesive. The flexible joints may comprise any suitable material which is bendable and may generate at least one degree of freedom. For example, the flexible joints may comprise carbon fibre, glass fibre, spring steel, or Nitinol (also known as Nickel Titanium).

The plurality of flexible members 16 includes a plurality of control cables that extend through at least some of the plurality of rigid members 12. For example, the first, second and third rigid members 122, 123 define apertures and the control cable 162 extends between the first and fourth rigid members 121, 124 and through the apertures of the first, second and third rigid members 121, 122, 123. The control cable may be connected to the fourth rigid member 124 via a welded joint, a brazed joint, a soldered joint, or via adhesive. It should be appreciated that the flexible tool 16 may comprise a plurality of control cables and that a single control cable is illustrated in FIG. 1 for clarity purposes only.

As described in the following paragraphs with reference to FIGS. 2 to 14, the plurality of flexible members 16 are arranged to enable the plurality of rigid members 12 to diverge from the longitudinal axis 14 (as indicated, for example, by arrows 26, 28, 30, 32) and define a work volume for the flexible tool 10. At least some of the plurality of flexible members 16 may be unevenly spaced around the longitudinal axis 14 and/or a physical characteristic of at least some of the plurality of flexible members 16 may vary along the longitudinal axis 14, to cause the work volume and/or stiffness of the flexible tool 10 to be asymmetric relative to the longitudinal axis 14.

When the plurality of rigid members 12 diverge from the longitudinal axis 14, the rigid members 12 define non-ninety degree angles with the longitudinal axis 14. For example, where the plurality of rigid members 12 have a disc shape, the rigid members 12 may diverge from the longitudinal axis 14 and the plane of the disc may define non-ninety degree angles with the longitudinal axis 14.

As used herein, the term 'asymmetric' means in relation to work volume that the flexible tool 10 may bend to a greater extent in a first direction from the longitudinal axis 14 when compared to a second direction from the longitudinal axis 14. For example, the flexible tool 10 may have an asymmetric work volume by being able to bend to a greater extent in a direction parallel to the X axis 20 than in a direction parallel to the Y axis 22. By way of another example, the flexible tool 10 may have an asymmetric work volume by being able to bend to a greater extent in a direction parallel to, and oriented towards, the +X axis 20, than in a direction parallel to, and oriented towards, the −X axis 20.

As used herein, the term 'asymmetric' means in relation to stiffness that the flexible tool 10 may have a greater stiffness in a first direction from the longitudinal axis 14 when compared to a second direction from the longitudinal axis 14. For example, the flexible tool 10 may have an asymmetric stiffness by being stiffer when bent in a direction parallel to the X axis 20 than in a direction parallel to the Y axis 22. By way of another example, the flexible tool 10 may have an asymmetric stiffness by being stiffer when bent in a direction parallel to and oriented towards the +X axis 20, than in a direction parallel to, and oriented towards, the −X axis 20.

The uneven spacing of the flexible members 16 may be uneven spacing of the flexible joints around the longitudinal axis 14. Alternatively, the uneven spacing of the flexible members 16 may be uneven spacing of the control cables around the longitudinal axis 14. Alternatively, the uneven spacing of the flexible members 16 may be uneven spacing between neighbouring flexible joints and control cables. The uneven spacing of the flexible members 16 may be provided by the flexible members 16 being spaced different distances apart from one another, but on the same circular path, when the flexible tool 10 is viewed along the Z axis 24. Additionally or alternatively, the uneven spacing of the flexible members 16 may be provided by the flexible members 16 being positioned on at least two different circular paths relative to one another, but positioned the same distance apart from one another, when the flexible tool 10 is viewed along the Z axis 24.

As described in more detail in the following paragraphs, the physical characteristic of the flexible members 16 that may vary along the longitudinal axis may include length of the plurality of flexible members between adjacent rigid members (where the length is the dimension of the flexible members along the Z axis 24). Additionally or alternatively, the physical characteristic of the plurality of flexible members may include the thickness of the plurality of flexible members (where the thickness is the dimension of the flexible members along the X axis 20 and/or the Y axis 22). Additionally or alternatively, the physical characteristic of the plurality of flexible members may include the material of the flexible members. For example, a first subset of flexible members 16 between two adjacent rigid members 12 may comprise a first material, and a second subset of flexible members 16 between two different adjacent rigid members 12 may comprise a second material. The first material may be different to the second material and may be more or less stiff than the second material, thus causing a variation in bending stiffness along the longitudinal axis 14.

In some examples, the flexible tool 10 may be a 'module'. As used herein, the term 'module' refers to a device or apparatus where one or more features are included at a later time, and possibly, by another manufacturer or by an end user. For example, where the flexible tool 10 is a module, the flexible tool 10 may only include the plurality of rigid members 12 and the flexible joints. The control cables may be added by another manufacturer, or by an end user.

The flexible tool 10 may provide several advantages. The asymmetric work volume and/or stiffness of the flexible tool 10 may advantageously enable the flexible tool 10 to machine or inspect a desired object that defines a relatively large angle with the longitudinal axis 14. For example, the asymmetric work volume of the flexible tool 10 may span an angle of 70 degrees in the Y axis 22 in the direction of the arrow 26 relative to the longitudinal axis 14, and span an angle of 20 degrees in the Y axis 22 in the direction of the arrow 28 relative to the longitudinal axis 14. In this example, the flexible tool 10 may be inserted into the system so that desired object may be reached by pivoting the flexible tool 10 in the direction of the arrow 26 (in other words, so that the desired object is positioned within the asymmetric work volume of the flexible tool 10).

The asymmetric work volume and/or stiffness of the flexible tool 10 may allow greater applicability and reach to objects in confined spaces. Where the object is a repair target within a gas turbine engine, the flexible tool 10 may provide greater repair capability whilst the gas turbine engine remains intact (that is, not disassembled) and on the wing of an aircraft. Therefore, the flexible tool 10 may reduce the time and cost for repairing a gas turbine engine.

Figure 2:
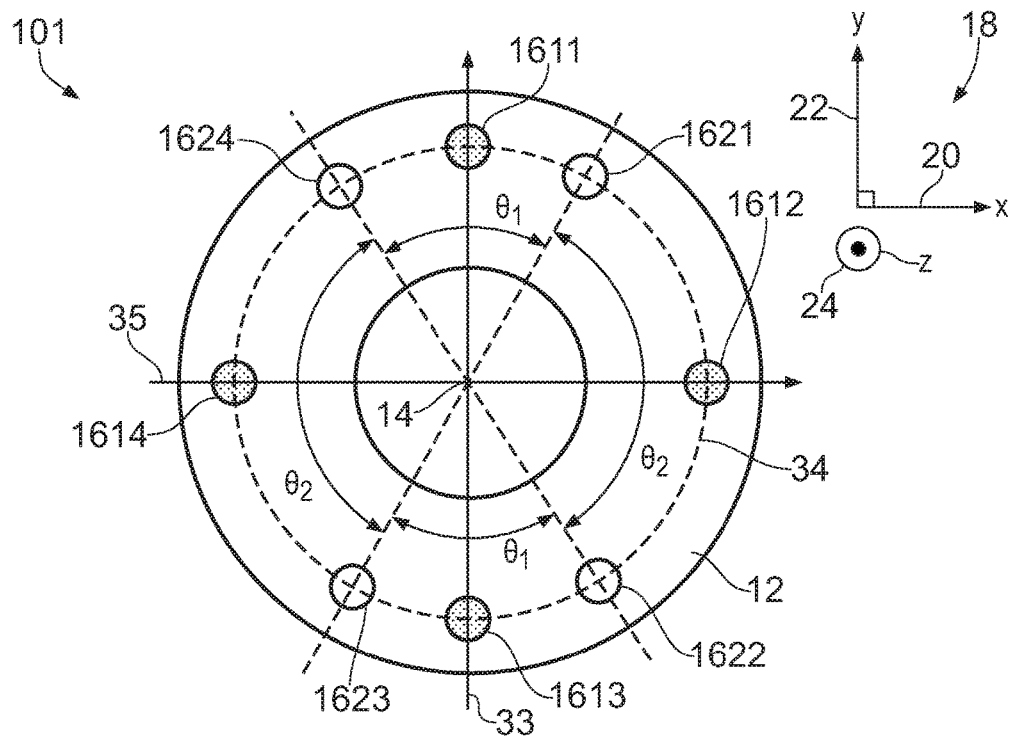
FIG. 2 illustrates a schematic plan view of a first flexible tool according to various examples.

FIG. 2 illustrates a schematic plan view of a first flexible tool 101 according to various examples. The first flexible tool 101 is similar to the flexible tool 10 and where the features are similar (or are the same), the same reference numerals are used. FIG. 2 also illustrates the Cartesian coordinate system 18.

The first flexible tool 101 includes a plurality of rigid members 12, a first flexible joint 1611, a second flexible joint 1612, a third flexible joint 1613, a fourth flexible joint 1614, a first control cable 1621, a second control cable 1622, a third control cable 1623 and a fourth control cable 1624. The flexible joints 1611, 1612, 1613, 1614 and the controls cables 1621, 1622, 1623, 1624 are positioned around the longitudinal axis 14 along a circular path 34 within the perimeter of the rigid members 12. It should be appreciated that the first and third flexible joints 1611, 1613 interconnect a first pair of rigid members (for example, the second and third rigid members 122, 123 illustrated in FIG. 1) and define a first pivot axis 33. The second and fourth flexible joints 1612, 1614 interconnect a second pair of rigid members (for example, the first and second rigid members 121 and 122 illustrated in FIG. 1) and define a second pivot axis 35.

The first, second, third and fourth flexible joints 1611, 1612, 1613, 1614 are positioned evenly around the circular path 34 at the twelve o clock position, the three o clock position, the six o clock position and the nine o clock position respectively. In other words, the length of the arcs of the circular path 34 between the first, second, third and fourth flexible joints 1611, 1612, 1613, 1614 are the same.

The first, second, third and fourth control cables 1621, 1622, 1623, 1624 are positioned unevenly around the circular path 34 at the one o clock position, the five o clock position, the seven o clock position and the eleven o clock position respectively. In more detail, the lengths of the arcs of the circular path 34 between the first and the second control cables 1621, 1622 and the third and fourth control cables 1623, 1624 are greater than the lengths of the arcs between the second and third control cables 1622, 1623 and the fourth and first control cables 1624, 1621. Therefore, the longitudinal axis 14 and the fourth and first control cables 1624, 1621 define a first angle θ1, and the longitudinal axis 14 and the second and third control cables 1622, 1623 also define the first angle θ1. The longitudinal axis 14 and the first and second control cables 1621, 1622 define a second angle θ2, and the longitudinal axis 14 and the third and fourth control cables 1623, 1624 also define the second angle θ2. The first angle θ1 is less than the second angle θ2.

The uneven positioning of the control cables 1621, 1622, 1623, 1624 around the longitudinal axis 14 causes the flexible tool 101 to have an asymmetric stiffness. In more detail, where the control cables are positioned closer to one another, the flexible tool 101 has an increased stiffness in those directions. For example, the control cable pair 1624 and 1621 are positioned relatively close to one another and cause the flexible tool 101 to have a relatively high stiffness when pivoted in the +Y direction (that is, about the second pivot axis 35). By way of another example, the control cable pair 1621, 1622 are positioned relatively far apart and cause the flexible tool 101 to have a relatively low stiffness when pivoted in the +X direction (that is, about the first pivot axis 33).

Figure 3:
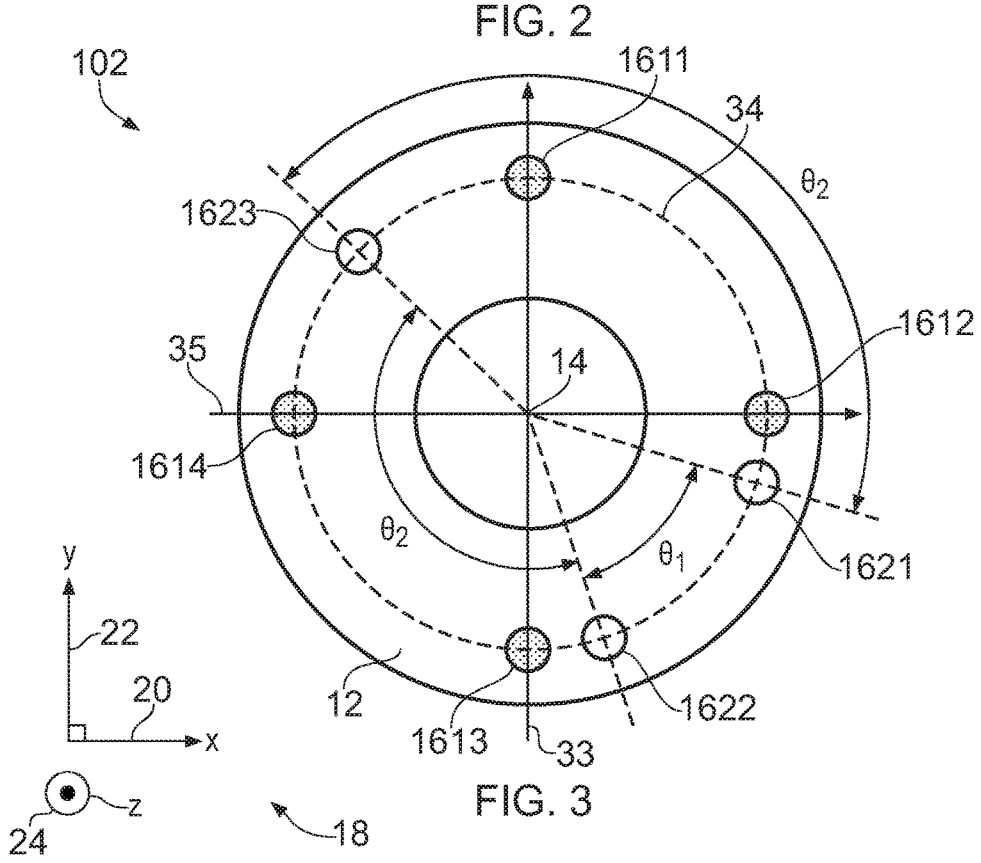
FIG. 3 illustrates a schematic plan view of a second flexible tool according to various examples.

FIG. 3 illustrates a schematic plan view of a second flexible tool 102 according to various examples. The second flexible tool 102 is similar to the first flexible tool 101 and where the features are similar (or are the same), the same reference numerals are used. FIG. 3 also illustrates the Cartesian coordinate system 18.

The second flexible tool 102 differs from the first flexible tool 101 in that the second flexible tool 102 includes three control cables (namely, the first control cable 1621, the second control cable 1622, and the third control cable 1623) instead of four control cables. The first control cable 1621 is positioned on the circular path 34 at the half past three position, the second control cable 1622 is positioned on the circular path 34 at the half past five position, and the third control cable 16 is positioned on the circular path 34 at the half past ten position.

The longitudinal axis 14 and the first and second control cables 1621, 1622 define a first angle θ1 there between. The longitudinal axis 14 and the second and third control cables 1622, 1623 define a second angle θ2 there between. The longitudinal axis 14 and the third and first control cables 1623, 1621 define the second angle θ2 there between. The second angle θ2 is greater than the first angle θ1.

As described above in relation to the first flexible tool 101, the uneven positioning of the control cables 1621, 1622, and 1623 around the longitudinal axis 14 causes the second flexible tool 102 to have an asymmetric stiffness. For example, the control cable pair 1621 and 1622 are positioned relatively close to one another and cause the second flexible tool 102 to have a relatively high stiffness when pivoted in the −Y or +X direction. By way of another example, the control cable pair 1623, 1621 are positioned relatively far apart and cause the second flexible tool 102 to have a relatively low stiffness when pivoted in the −X or the +Y direction.

Figure 4:
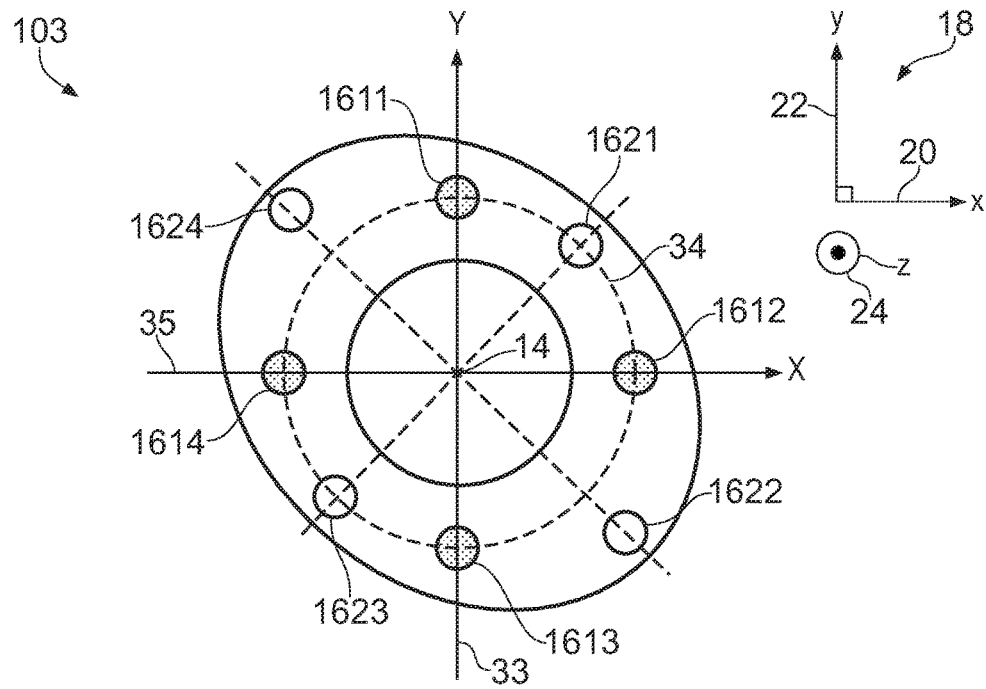
FIG. 4 illustrates a schematic plan view of a third flexible tool according to various examples.

FIG. 4 illustrates a schematic plan view of a third flexible tool 103 according to various examples. The third flexible tool 103 is similar to the first flexible tool 101 and where the features are similar (or are the same), the same reference numerals are used. FIG. 4 also illustrates the Cartesian coordinate system 18.

The third flexible tool 103 differs from the first flexible tool 101 in that the plurality of rigid members 12 have increased thicknesses in the half past four and half past ten positions and consequently have an elliptical shape. The control cables are unevenly positioned around the longitudinal axis 14. In more detail, the first control cable 1621 and the third control cable 1623 are positioned on the circular path 34 at the half past one and half past seven positions respectively. The second control cable 1622 and the fourth control cable 1624 are positioned outside of the circular path 34 at the half past four position and the half past ten position respectively (and therefore within the increased thickness of the rigid members 12). Consequently, the second and fourth control cables 1622, 1624 have a pitch circle diameter that is greater than the pitch circle diameter of the first and third control cables 1621, 1623.

The uneven positioning of the control cables causes the third flexible tool 103 to have an asymmetric stiffness. In particular, by increasing the pitch circle diameter of the second and fourth control cables 1622, 1624, the second and fourth control cables 1622, 1624 may generate more torque for pivoting the third flexible tool 103. Consequently, the third flexible tool 103 has a higher stiffness in the directions where the pitch circle diameter is increased.

Figure 5:
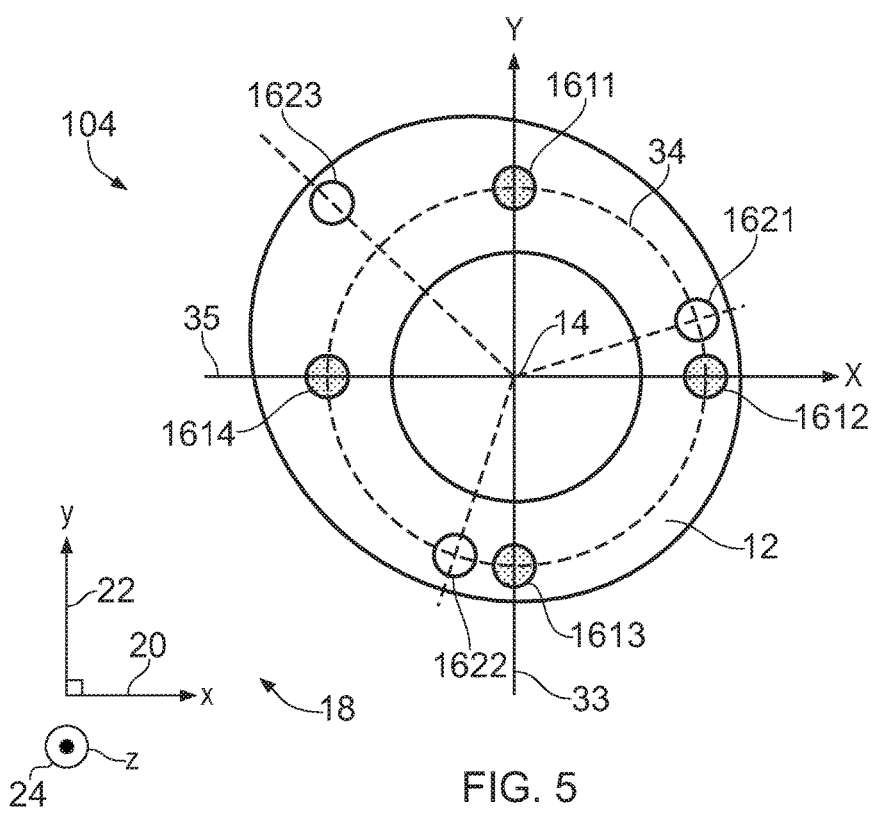
FIG. 5 illustrates a schematic plan view of a fourth flexible tool according to various examples.

FIG. 5 illustrates a schematic plan view of a fourth flexible tool 104 according to various examples. The fourth flexible tool 104 is similar to the third flexible tool 103 and where the features are similar, the same reference numerals are used. FIG. 5 also illustrates the Cartesian coordinate system 18.

The fourth flexible tool 104 differs from the third flexible tool 103 in that the plurality of rigid members 12 have increased thicknesses in the half past ten position only. Additionally, the fourth flexible tool 104 comprises three control cables (namely, the first control cable 1621, the second control cable 1622, and the third control cable 1623) instead of four control cables.

The control cables 1621, 1622, 1623 are unevenly positioned around the longitudinal axis 14. In more detail, the first control cable 1621 and the second control cable 1622 are positioned on the circular path 34 at the half past two and the half past six positions respectively. The third control cable 1623 is positioned outside of the circular path 34 at the half past ten position (and therefore within the increased thickness of the rigid members 12). Consequently, the third control cable 1623 has a pitch circle diameter that is greater than the pitch circle diameter of the first and second control cables 1621, 1622.

The uneven positioning of the control cables 1621, 1622, 1623 causes the fourth flexible tool 104 to have an asymmetric stiffness. In particular, by increasing the pitch circle diameter of the third control cable 1623, the third control cable 1623 may generate more torque for pivoting the fourth flexible tool 104. Consequently, the fourth flexible tool 104 has a higher stiffness in the half past ten direction where the pitch circle diameter is increased.

Figure 6A:
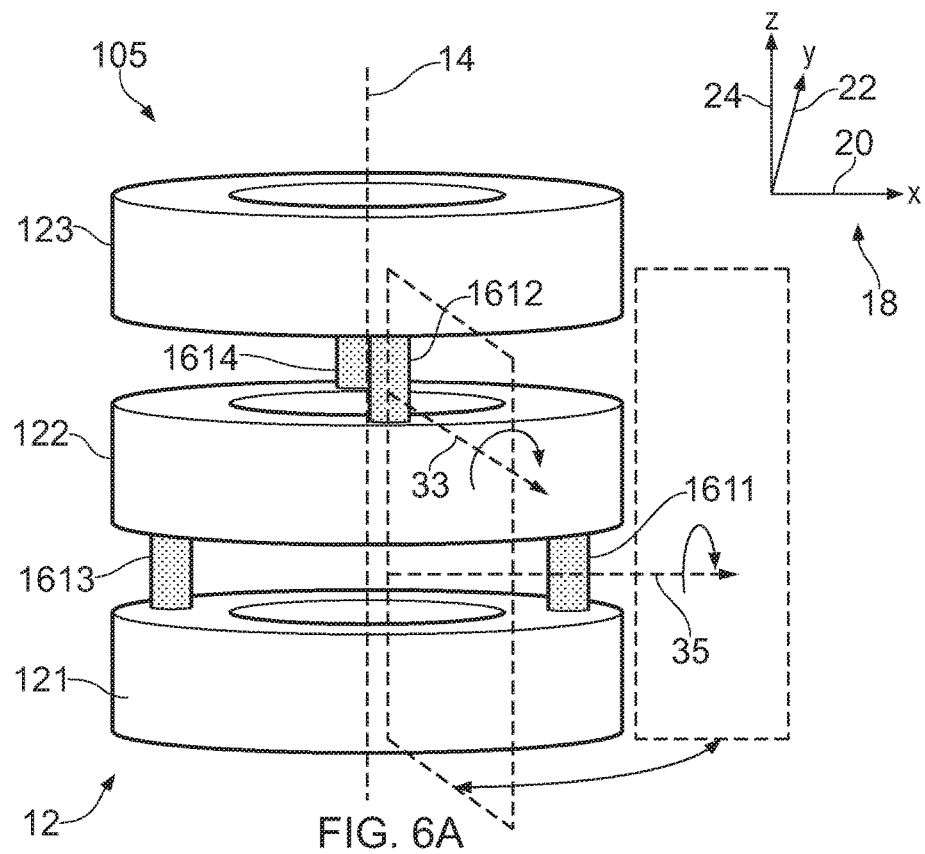
FIG. 6A illustrates a schematic side view of a fifth flexible tool according to various examples.
Figure 6B:
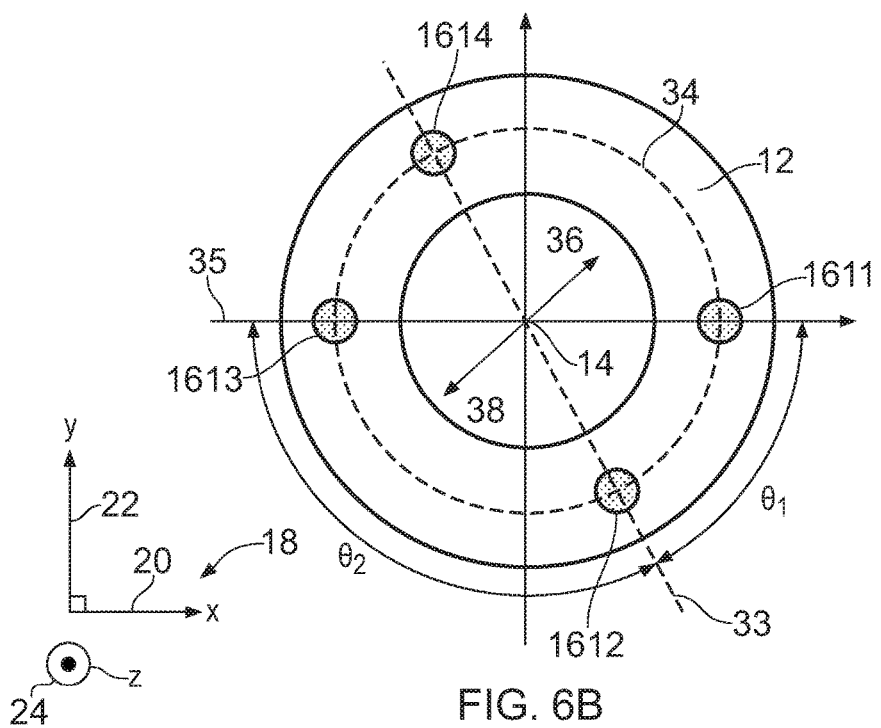
FIG. 6B illustrates a schematic plan view of the fifth flexible tool illustrated in FIG. 6A.

FIGS. 6A and 6B illustrate a fifth flexible tool 105 according to various examples. The fifth flexible tool 105 is similar to the flexible tool 10 illustrated in FIG. 1 and where the features are similar, the same reference numerals are used. FIGS. 6A & 6B also illustrate the Cartesian coordinate system 18.

The fifth flexible tool 105 includes a first rigid member 121, a second rigid member 122, a third rigid member 123, a first flexible joint 1611, a second flexible joint 1612, a third flexible joint 1613 and a fourth flexible joint 1614. The fifth flexible tool 105 may also comprise control cables that are not illustrated in FIGS. 6A and 6B to maintain the clarity of the figures.

The first and third flexible joints 1611, 1613 interconnect the first rigid member 121 and the second rigid member 122 and are positioned on the circular path 34. The second and fourth flexible joints 1612, 1614 interconnect the second rigid member 122 and the fourth rigid member 124 and are positioned on the circular path 34. The first and third flexible joints 1611, 1613 define a pivot axis 35 that is parallel to the X axis 20. The second and fourth flexible joints 1612, 1614 define a pivot axis 33 that defines an angle θ1 with the X axis 20.

The first, second, third and fourth flexible joints 1611, 1612, 1613, 1614 are positioned unevenly around the circular path 34 at the three o clock position, the five o clock position, the nine o clock position and the eleven o clock position respectively. In more detail, the lengths of the arcs of the circular path 34 between the first and the second flexible joints 1611, 1612 and the third and fourth flexible joints 1613, 1614 are less than the lengths of the arcs between the second and third flexible joints 1612, 1613 and the fourth and first flexible joints 1614, 1611. Therefore, the longitudinal axis 14 and the first and second flexible joints 1611, 1612 define a first angle θ1, and the longitudinal axis 14 and the third and the fourth flexible joints 1613, 1614 also define the first angle θ1. The longitudinal axis 14 and the second and the third flexible joints 1612, 1613 define a second angle θ2, and the longitudinal axis 14 and the fourth and first flexible joints 1614, 1611 also define the second angle θ2. The first angle θ1 is less than the second angle θ2.

The uneven positioning of the flexible joints 1611, 1612, 1613, 1614 around the longitudinal axis 14 causes the fifth flexible tool 105 to have an asymmetric work volume. In more detail, the positioning of the second and fourth flexible joints 1612, 1614 provides the pivot axis 33 that is at a non-ninety degree angle relative to the pivot axis 35 defined by the first and third flexible joints 1611, 1613. This orientation of the pivot axes 33, 35 provides the flexible tool 105 with a first direction of maximum bend as indicated by arrow 36 and a second direction of maximum bend as indicated by arrow 38. In other words, the orientation of the pivot axes 33, 35 defined by the flexible joints enable the fifth flexible tool 105 to bend at a greater angle in the directions indicated by arrows 36, 38 than in other directions.

Figure 7A:
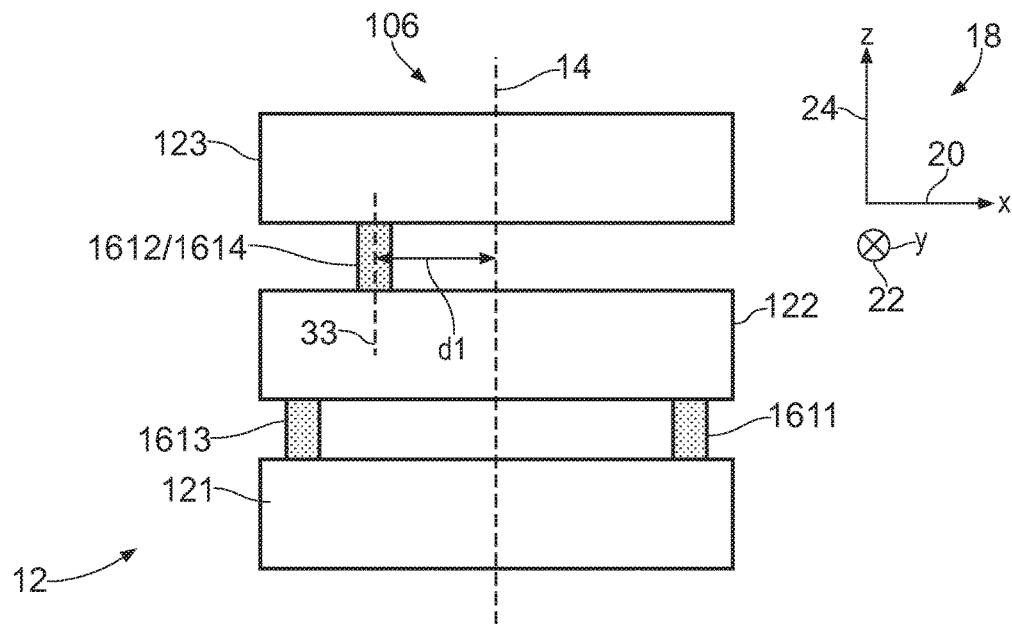
FIG. 7A illustrates a schematic side view of a sixth flexible tool according to various examples.
Figure 7B:
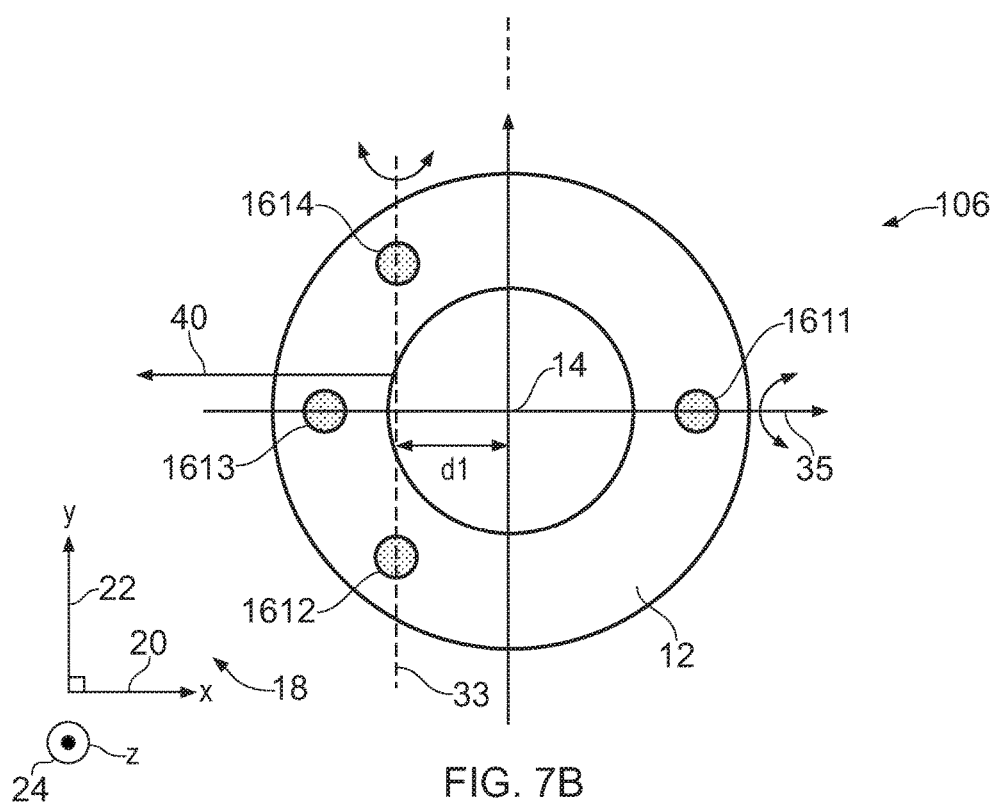
FIG. 7B illustrates a schematic plan view of the sixth flexible tool illustrated in FIG. 7A.

FIGS. 7A and 7B illustrate a sixth flexible tool 106 according to various examples. The sixth flexible tool 106 is similar to the flexible tool 10 illustrated in FIG. 1 and where the features are similar, the same reference numerals are used. FIGS. 7A & 7B also illustrate the Cartesian coordinate system 18.

The sixth flexible tool 106 includes a first rigid member 121, a second rigid member 122, a third rigid member 123, a first flexible joint 1611, a second flexible joint 1612, a third flexible joint 1613 and a fourth flexible joint 1614. The sixth flexible tool 106 may also comprise control cables that are not illustrated in FIGS. 7A and 7B to maintain the clarity of the figures.

The first and third flexible joints 1611, 1613 interconnect the first rigid member 121 and the second rigid member 122. The second and fourth flexible joints 1612, 1614 interconnect the second rigid member 122 and the third rigid member 123. The first and third flexible joints 1611, 1613 define a pivot axis 35 that is parallel to the X axis 20 and intersects the longitudinal axis 14. The second and fourth flexible joints 1612, 1614 define a pivot axis 33 that does not intersect the longitudinal axis 14 and is offset from the longitudinal axis 14 by a first distance (d1).

The first, second, third and fourth flexible joints 1611, 1612, 1613, 1614 are positioned unevenly around the longitudinal axis 14 at the three o clock position, the seven o clock position, the nine o clock position and the eleven o clock position respectively. Therefore, the distance between the first flexible joint 1611 and the second flexible joint 1614, and the distance between the first flexible joint 1611 and the fourth flexible joint 1614, is greater than the distance between the third flexible joint 1613 and the second flexible joint 1612, and the distance between the third flexible joint 1613 and the fourth flexible joint 1614.

The uneven positioning of the flexible joints 1611, 1612, 1613, 1614 around the longitudinal axis 14 causes the sixth flexible tool 106 to have an asymmetric work volume. In more detail, the offsetting of the pivot axis 33 defined by the second and fourth flexible joints 1612, 1614 from the longitudinal axis 14 causes the sixth flexible tool 106 to have a direction of maximum bend as indicated by arrow 40 (that is, the direction of maximum bend is oriented parallel to the −X direction). In particular, the second and third rigid members 122, 123 may pivot through a greater angle in the −X direction before they abut one another, than in the +X direction (for example) due to the offsetting of the pivot axis 33 defined by the second and fourth flexible joints 1612, 1614.

Figure 8:
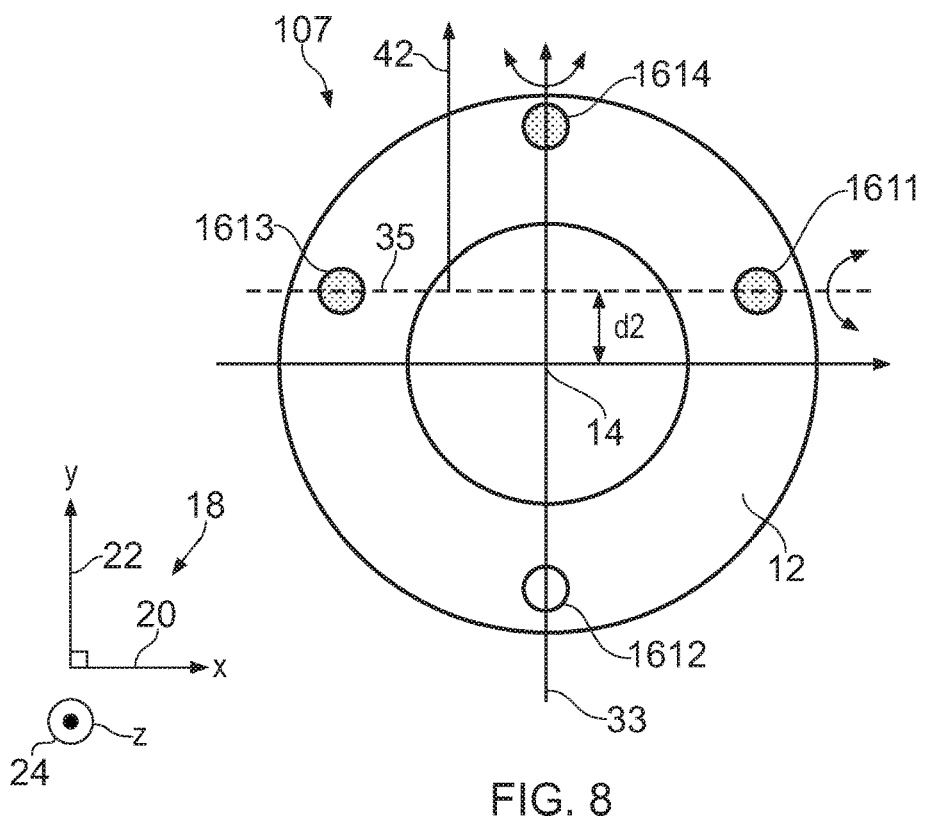
FIG. 8 illustrates a schematic plan view of a seventh flexible tool according to various examples.

FIG. 8 illustrates a seventh flexible tool 107 according to various examples. The seventh flexible tool 107 is similar to the sixth flexible tool 106 illustrated in FIGS. 7A, 7B and where the features are similar, the same reference numerals are used. FIG. 8 also illustrates the Cartesian coordinate system 18.

The seventh flexible tool 107 includes a plurality of rigid members 12, a first flexible joint 1611, a second flexible joint 1612, a third flexible joint 1613 and a fourth flexible joint 1614. The seventh flexible tool 107 may also comprise control cables that are not illustrated in FIG. 8 to maintain the clarity of the figures.

The seventh flexible tool 107 differs from the sixth flexible tool 106 in that the pivot axis 33 defined by the second flexible joint 1612 and the fourth flexible joint 1614 is parallel to the Y axis 22 and intersects the longitudinal axis 14. The seventh flexible tool 107 also differs in that the pivot axis 35 defined by the first flexible joint 1611 and the third flexible joint 1613 is parallel to the X axis 20 and does not intersect the longitudinal axis 14. Consequently, the pivot axis 35 defined by the first flexible joint 1611 and the third flexible joint 1613 and the longitudinal axis 14 define a gap having a distance d2 there between.

The uneven positioning of the flexible joints 1611, 1612, 1613, 1614 around the longitudinal axis 14 causes the seventh flexible tool 107 to have an asymmetric work volume. In more detail, the offsetting of the pivot axis 35 defined by the first and third flexible joints 1611, 1613 from the longitudinal axis 14 causes the seventh flexible tool 107 to have a direction of maximum bend as indicated by arrow 42 (that is, the direction of maximum bend is oriented in the +Y direction). In particular, the rigid members interconnected by the first and third flexible joints 1611, 1613 may pivot through a greater angle in the +Y direction before they abut one another, than in the −Y direction (for example) due to the offsetting of the pivot defined by the first and third flexible joints 1611, 1613.

Figure 9:
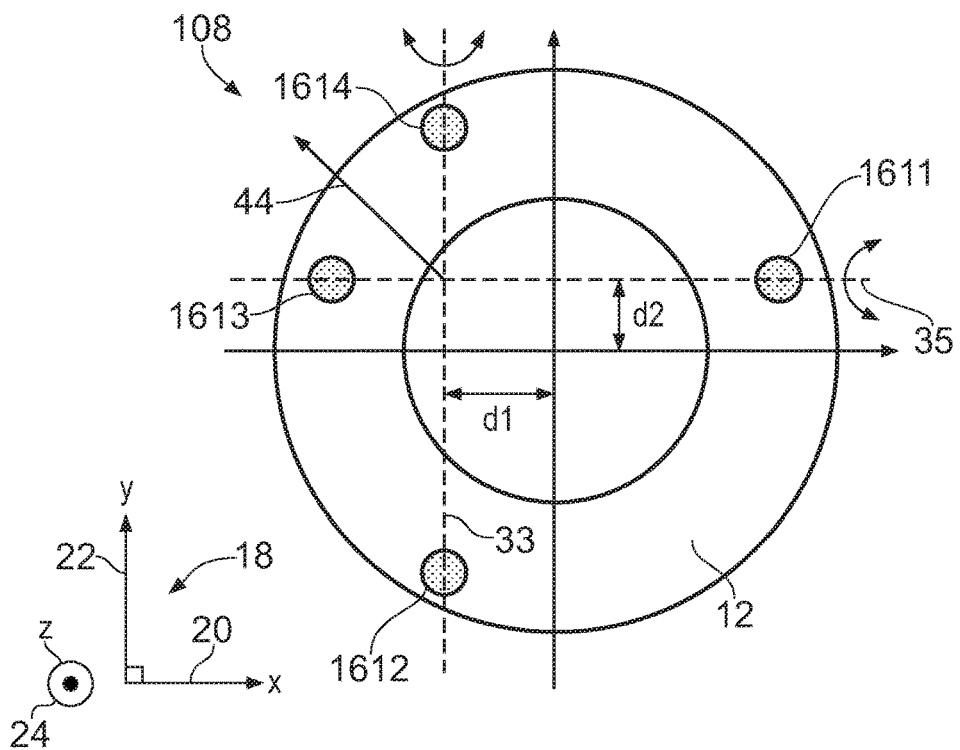
FIG. 9 illustrates a schematic plan view of an eighth flexible tool according to various examples.

FIG. 9 illustrates an eighth flexible tool 108 according to various examples. The eighth flexible tool 108 is similar to the sixth flexible tool 106 and to the seventh flexible tool 107 illustrated in FIGS. 7A, 7B and 8 respectively, and where the features are similar, the same reference numerals are used. FIG. 9 also illustrates the Cartesian coordinate system 18.

The eighth flexible tool 108 includes a plurality of rigid members 12, a first flexible joint 1611, a second flexible joint 1612, a third flexible joint 1613 and a fourth flexible joint 1614. The eighth flexible tool 108 may also comprise control cables that are not illustrated in FIG. 9 to maintain the clarity of the figures.

The eighth flexible tool 108 may be considered a combination of the sixth flexible tool 106 and the seventh flexible tool 107. In particular, the pivot axis 35 defined by the first flexible joint 1611 and the third flexible joint 1613 is parallel to the X axis 20 and does not intersect the longitudinal axis 14 (the pivot axis 35 defines a gap with the longitudinal axis 14 having a distance d2). The pivot axis 33 defined by the second flexible joint 1612 and the fourth flexible joint 1614 is parallel to the Y axis 22 and does not intersect the longitudinal axis 14 (the pivot axis 33 defines a gap with the longitudinal axis 14 having a distance d1).

The uneven positioning of the flexible joints 1611, 1612, 1613, 1614 around the longitudinal axis 14 causes the eighth flexible tool 107 to have an asymmetric work volume. In more detail, the offsetting of the pivot axes 35, 33 defined by the first and third flexible joints 1611, 1613, and by the second and fourth flexible joints 1612, 1614, from the longitudinal axis 14 causes the eighth flexible tool 108 to have a direction of maximum bend as indicated by arrow 44 (that is, the direction of maximum bend is oriented in a direction having a +Y component and a −X component).

Figure 10:
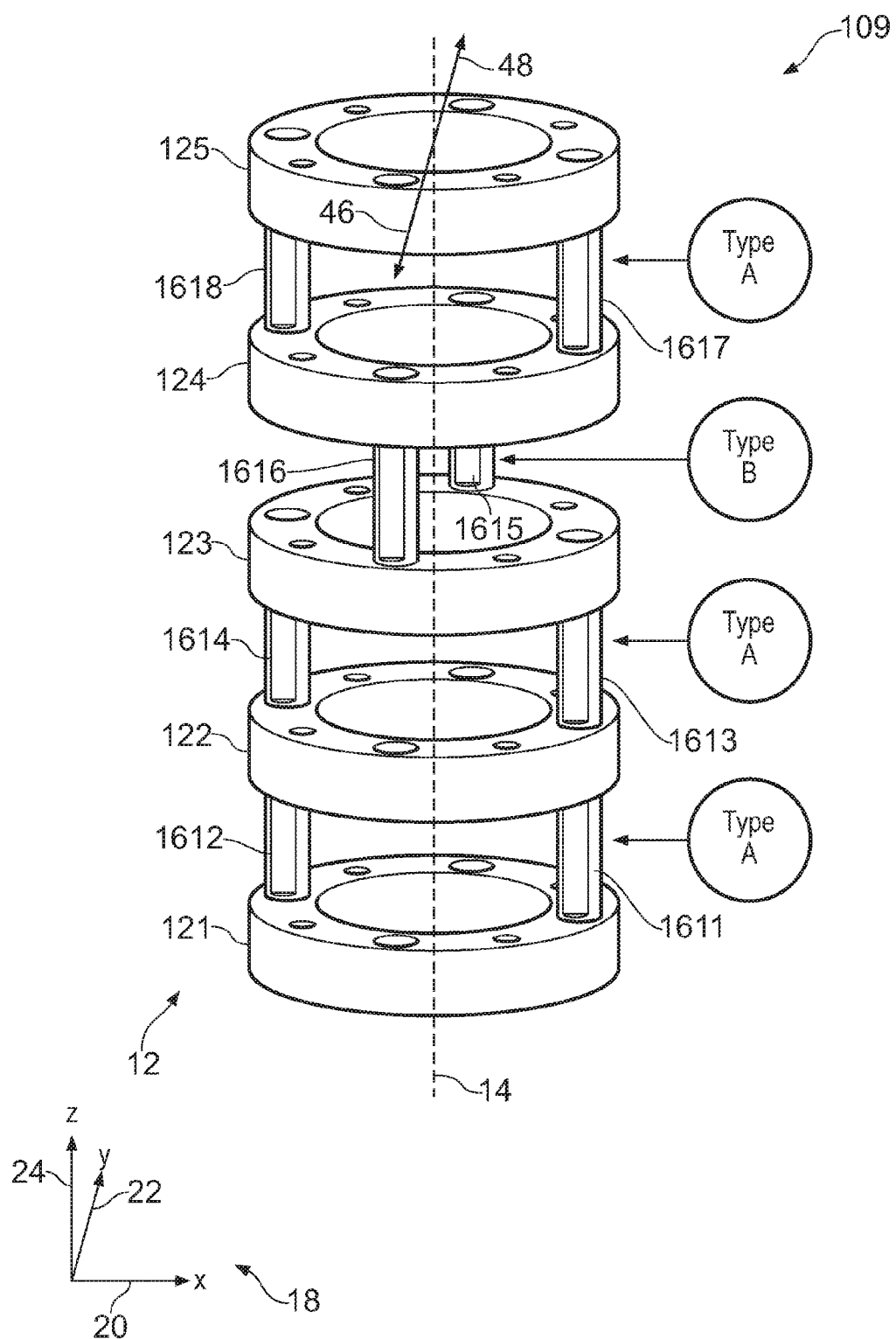
FIG. 10 illustrates a perspective view of a ninth flexible tool according to various examples.

FIG. 10 illustrates a ninth flexible tool 109 according to various examples. The ninth flexible tool 109 is similar to the flexible tool 10 illustrated in FIG. 1 and where the features are similar, the same reference numerals are used. FIG. 10 also illustrates the Cartesian coordinate system 18.

The ninth flexible tool 109 includes a first rigid member 121, a second rigid member 122, a third rigid member 123, a fourth rigid member 124, a fifth rigid member 125, a first flexible joint 1611, a second flexible joint 1612, a third flexible joint 1613, a fourth flexible joint 1614, a fifth flexible joint 1615, a sixth flexible joint 1616, a seventh flexible joint 1617 and an eighth flexible joint 1618. The ninth flexible tool 109 may also comprise control cables that are not illustrated in FIG. 10 to maintain the clarity of the figure.

The first and second flexible joints 1611, 1612 interconnect the first rigid member 121 and the second rigid member 122. The third and fourth flexible joints interconnect the second rigid member 122 and the third rigid member 123. The fifth and sixth flexible joints interconnect the third rigid member 123 and the fourth rigid member 124. The seventh and eighth flexible joints interconnect the fourth rigid member 124 and the fifth rigid member 125.

The first and second flexible joints 1611, 1612, the third and fourth flexible joints 1613, 1614, and the seventh and eighth flexible joints 1617, 1618 define pivot axes that are oriented parallel to the X axis 20 (the 'type A' pivot axis as illustrated in FIG. 10). The fifth and sixth flexible joints 1615, 1616 define a pivot axis that is oriented parallel to the Y axis 22 (the 'type B' pivot axis as illustrated in FIG. 10).

The uneven positioning of the flexible joints 1611, 1612, 1613, 1614 around the longitudinal axis 14 causes the ninth flexible tool 109 to have an asymmetric work volume. In more detail, the overlaying relationship of the first and second flexible joints 1611, 1612 with the third and fourth flexible joints 1613, 1614 causes the ninth flexible tool 109 to have a first direction of maximum bend as indicated by arrow 46 (that is, in the −Y direction) and a second direction of maximum bend as indicated by arrow 48 (that is, in the +Y direction). In other words, the orientation of the pivots defined by the flexible joints enable the ninth flexible tool 109 to bend at a greater angle in the directions indicated by arrows 46, 48 than in other directions (such as a direction parallel to the X axis 20).

Figure 11:
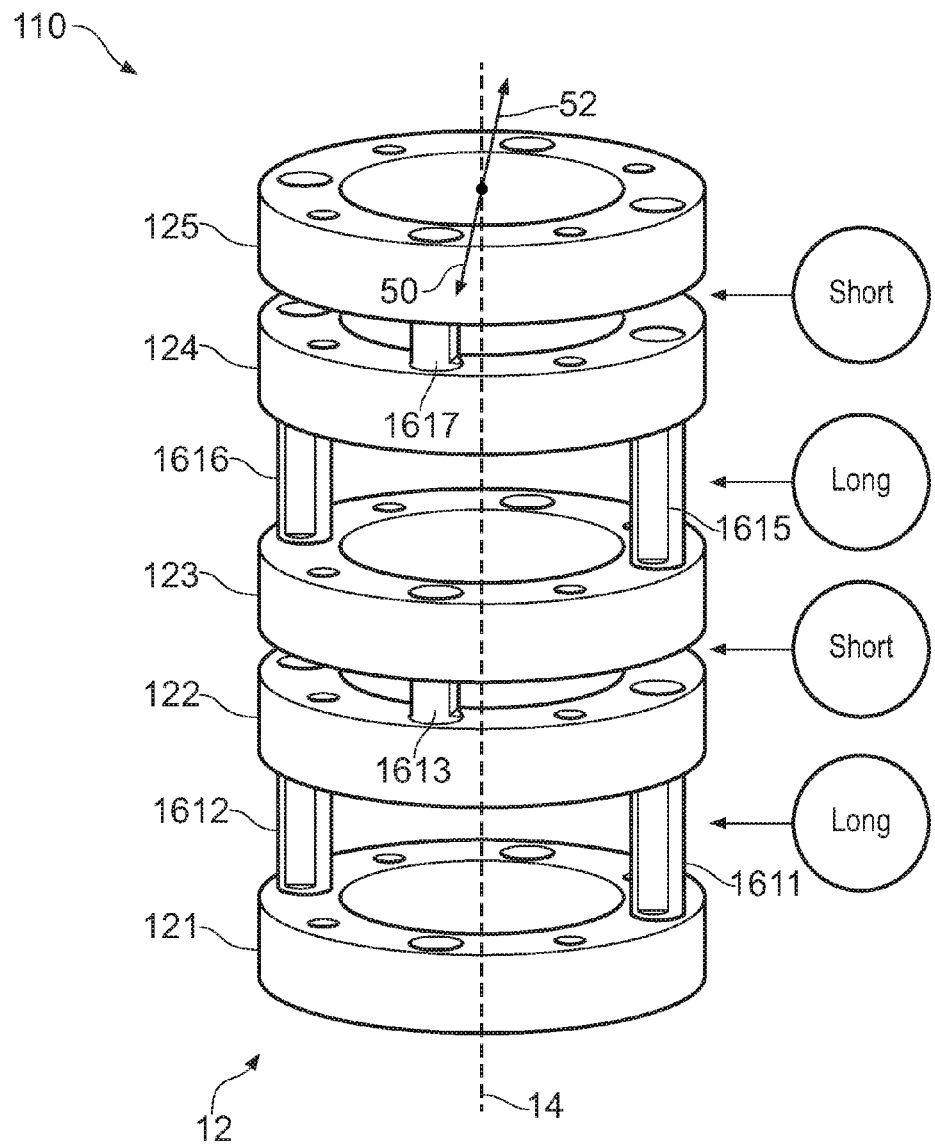
FIG. 11 illustrates a perspective view of a tenth flexible tool according to various examples.
Figure 11:
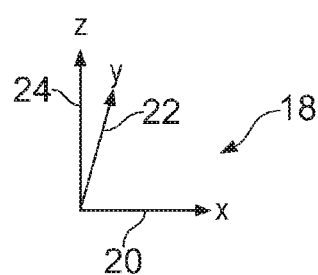

FIG. 11 illustrates a tenth flexible tool 110 according to various examples. The tenth flexible tool 110 is similar to the flexible tool 10 illustrated in FIG. 1 and where the features are similar, the same reference numerals are used. FIG. 11 also illustrates the Cartesian coordinate system 18.

The tenth flexible tool 110 includes a first rigid member 121, a second rigid member 122, a third rigid member 123, a fourth rigid member 124, a fifth rigid member 125, a first flexible joint 1611, a second flexible joint 1612, a third flexible joint 1613, a fourth flexible joint (not illustrated in FIG. 11 since it is obscured from view), a fifth flexible joint 1615, a sixth flexible joint 1616, a seventh flexible joint 1617 and an eighth flexible joint (not illustrated in FIG. 11 since it is obscured from view). The tenth flexible tool 110 may also comprise control cables that are not illustrated in FIG. 11 to maintain the clarity of the figure.

The first and second flexible joints 1611, 1612 interconnect the first rigid member 121 and the second rigid member 122. The third and fourth flexible joints interconnect the second rigid member 122 and the third rigid member 123. The fifth and sixth flexible joints interconnect the third rigid member 123 and the fourth rigid member 124. The seventh and eighth flexible joints interconnect the fourth rigid member 124 and the fifth rigid member 125.

The first and second flexible joints 1611, 1612, and the fifth and sixth flexible joints 1615, 1616 have a first length along the Z axis 24 and define pivot axes that are oriented parallel to the X axis 20. The third and fourth flexible joints 1613, 1614 and the seventh and eighth flexible joints 1617, 1618 have a second length along the Z axis 24 and define pivot axis that are oriented parallel to the Y axis 22. The first length of the first, second, fifth and sixth flexible joints 1611, 1612, 1615, 1616 is greater than the second length of the third, fourth, seventh and eighth flexible joints 1613, 1614, 1617, 1618.

The varying physical characteristic of the flexible joints 1611, 1612, 1613, 1614, 1616, 1617, 1618 along the longitudinal axis 14 causes the tenth flexible tool 109 to have an asymmetric work volume and stiffness. In more detail, the relatively shorter length of the third, fourth, seventh and eighth flexible joints 1613, 1614, 1617, 1618 causes the tenth flexible tool 110 to have a first direction of maximum bend as indicated by arrow 50 (that is, in the −Y direction) and a second direction of maximum bend as indicated by arrow 52 (that is, in the +Y direction). In other words, the relative lengths of the flexible joints enable the tenth flexible tool 110 to bend at a greater angle in the directions indicated by arrows 50, 52 (and have a reduced stiffness) than in other directions (such as a direction parallel to the X axis 20).

Figure 12:
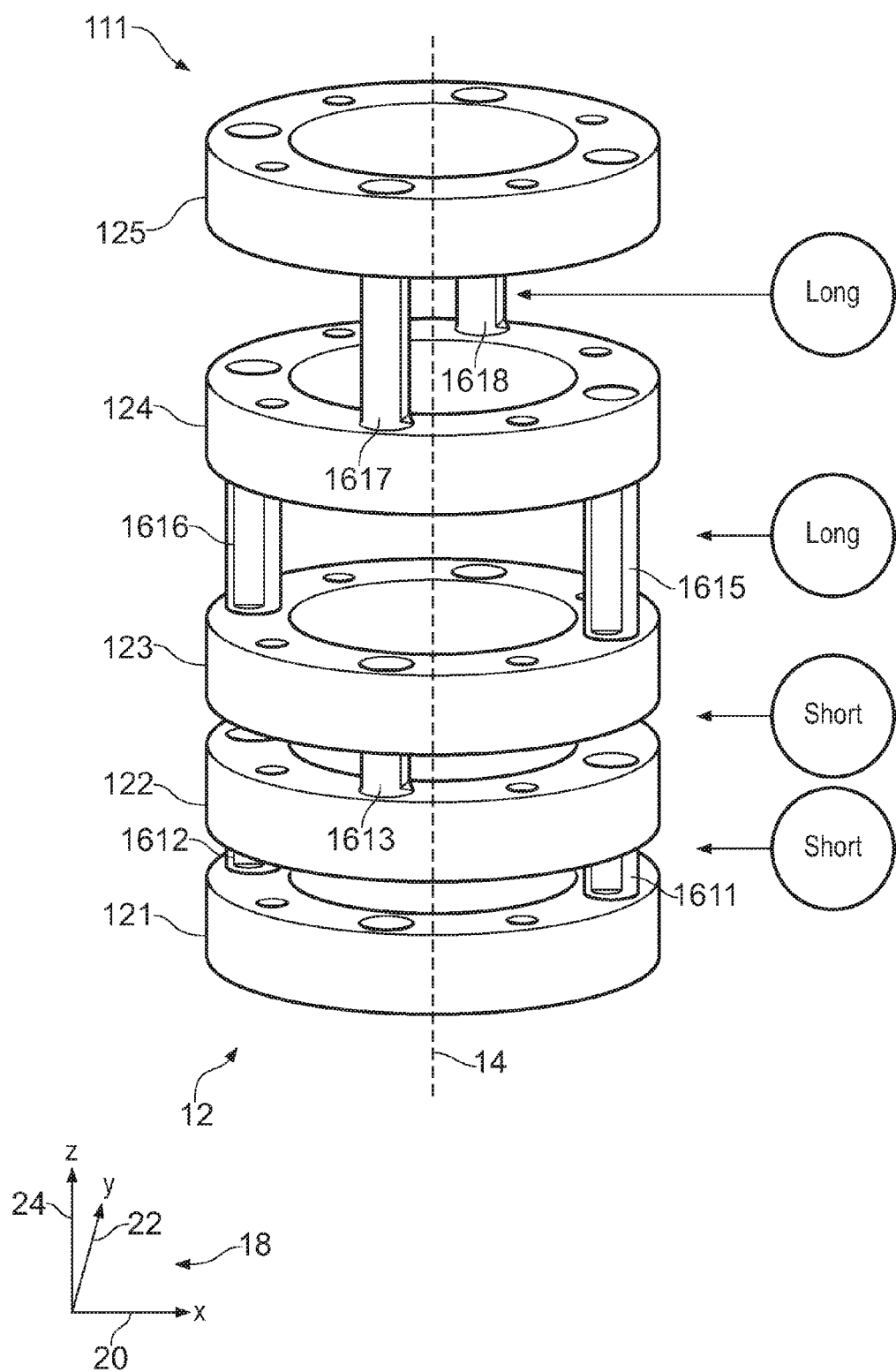
FIG. 12 illustrates a perspective view of an eleventh flexible tool according to various examples.

FIG. 12 illustrates an eleventh flexible tool 111 according to various examples. The eleventh flexible tool 111 is similar to the tenth flexible tool 110 and where the features are similar, the same reference numerals are used. FIG. 12 also illustrates the Cartesian coordinate system 18.

The eleventh flexible tool 111 differs from the tenth flexible tool 110 in that the first, second, third and fourth flexible joints 1611, 1612, 1613, and 1614 are relatively short, and the fifth, sixth, seventh, and eighth flexible joints 1615, 1616, 1617, 1618 are relatively long.

The relative lengths of the flexible joints provide the eleventh flexible tool 111 with a variation in bend stiffness along the longitudinal axis 14. In particular, the relatively short length of the first, second, third and fourth flexible joints 1611, 1612, 1613, 1614 cause the eleventh flexible tool 111 to have relatively high stiffness between the first, second and third rigid members 121, 122, 123. The relatively long length of the fifth, sixth, seventh and eighth flexible joints 1615, 1616, 1617, 1618 cause the eleventh flexible tool 111 to have relatively low stiffness between the third, fourth and fifth rigid members 123, 124, 125.

The eleventh flexible tool 111 may be incorporated into another flexible tool (as described in the present patent application) to provide that flexible tool with a variation in bend stiffness along the longitudinal axis 14.

Figure 13:
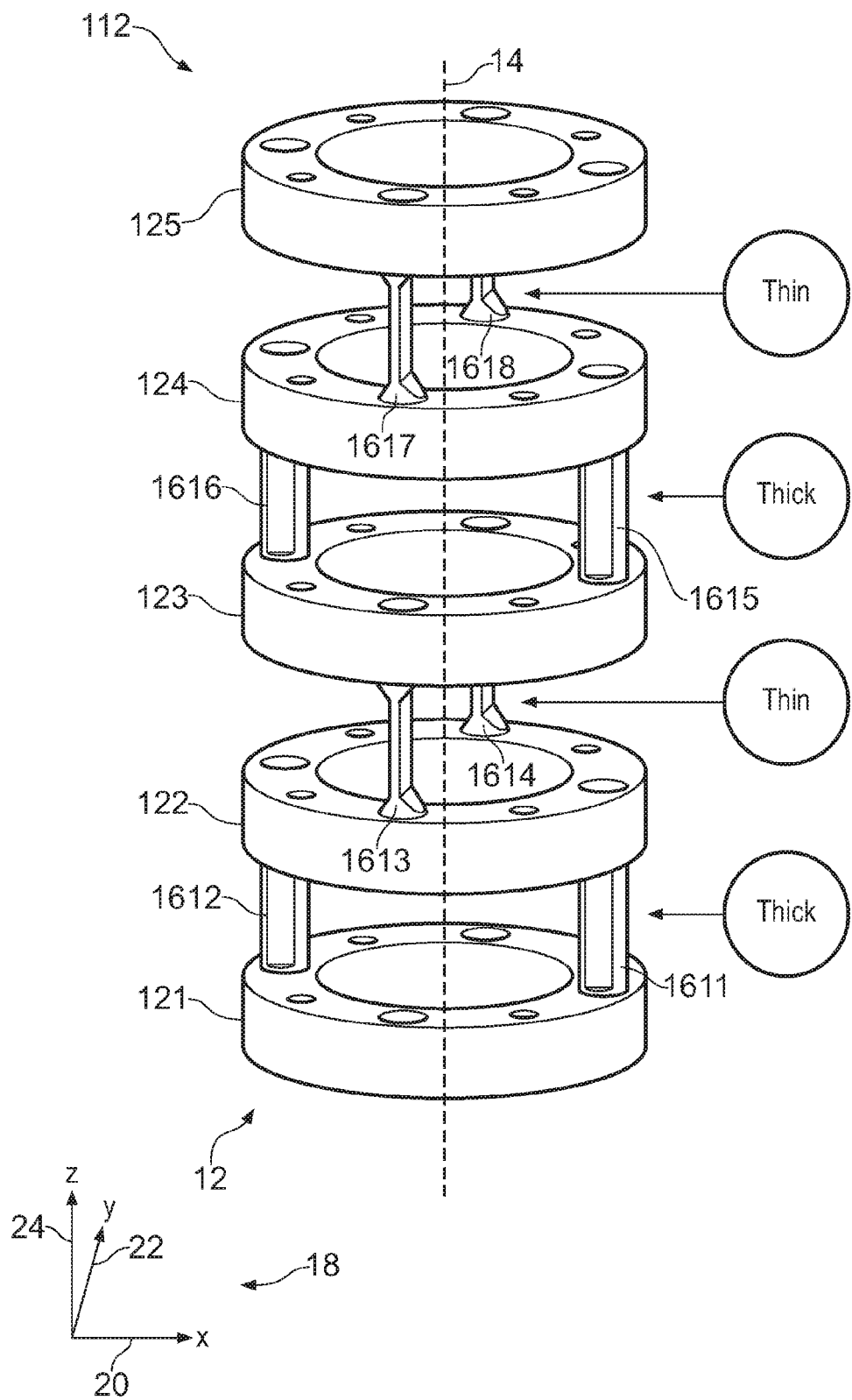
FIG. 13 illustrates a perspective view of a twelfth flexible tool according to various examples.

FIG. 13 illustrates a twelfth flexible tool 112 according to various examples. The twelfth flexible tool 112 is similar to the flexible tool 10 illustrated in FIG. 1 and where the features are similar, the same reference numerals are used. FIG. 13 also illustrates the Cartesian coordinate system 18.

The twelfth flexible tool 112 includes a first rigid member 121, a second rigid member 122, a third rigid member 123, a fourth rigid member 124, a fifth rigid member 125, a first flexible joint 1611, a second flexible joint 1612, a third flexible joint 1613, a fourth flexible joint 1614, a fifth flexible joint 1615, a sixth flexible joint 1616, a seventh flexible joint 1617 and an eighth flexible joint 1618. The twelfth flexible tool 112 may also comprise control cables that are not illustrated in FIG. 13 to maintain the clarity of the figure.

The first and second flexible joints 1611, 1612 interconnect the first rigid member 121 and the second rigid member 122. The third and fourth flexible joints interconnect the second rigid member 122 and the third rigid member 123. The fifth and sixth flexible joints interconnect the third rigid member 123 and the fourth rigid member 124. The seventh and eighth flexible joints interconnect the fourth rigid member 124 and the fifth rigid member 125.

The first and second flexible joints 1611, 1612, and the fifth and sixth flexible joints 1615, 1616 have a first thickness (in the Y axis 22) and define pivot axes that are oriented parallel to the X axis 20. The third and fourth flexible joints 1613, 1614 and the seventh and eighth flexible joints 1617, 1618 have a second thickness (in the X axis 20) and define pivot axis that are oriented parallel to the Y axis 22. The first thickness of the first, second, fifth and sixth flexible joints 1611, 1612, 1615, 1616 is greater than the second thickness of the third, fourth, seventh and eighth flexible joints 1613, 1614, 1617, 1618.

The varying physical characteristic of the flexible joints 1611, 1612, 1613, 1614, 1616, 1617, 1618 along the longitudinal axis 14 causes the twelfth flexible tool 112 to have an asymmetric stiffness about the longitudinal axis 14. In more detail, the lower thickness of the third, fourth, seventh and eighth flexible joints 1613, 1614, 1617, 1618 in the direction of pivoting causes the twelfth flexible tool 112 to be less stiff when pivoted in the +X direction and the −X direction than in the +Y direction and the −Y direction. In other words, the varying thickness of the flexible joints enable the twelfth flexible tool 112 to be less stiff when pivoted in the X axis 20 than when pivoted in the Y axis 22.

Figure 14:
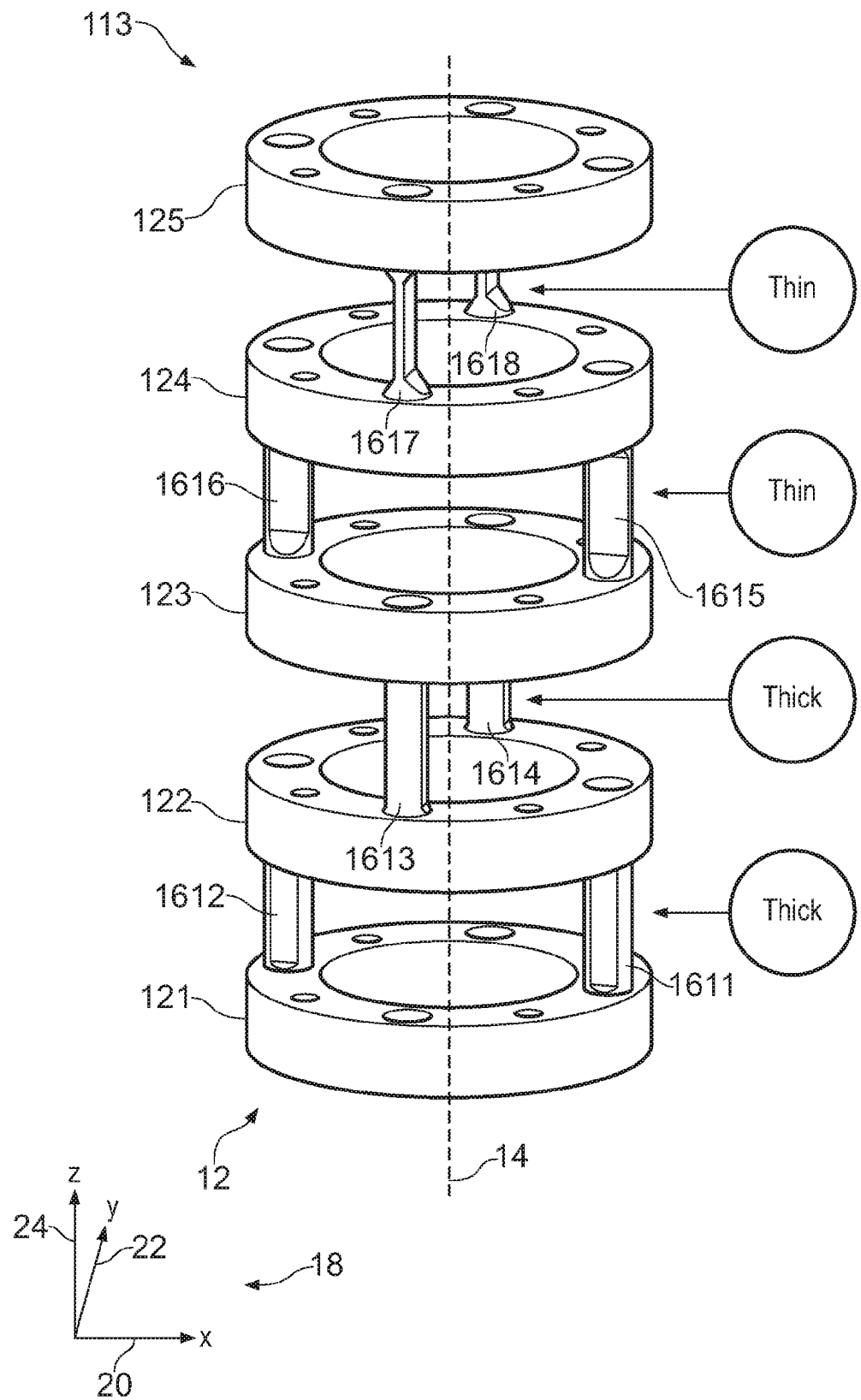
FIG. 14 illustrates a perspective view of a thirteenth flexible tool according to various examples.

FIG. 14 illustrates a thirteenth flexible tool 113 according to various examples. The thirteenth flexible tool 113 is similar to the twelfth flexible tool 112 illustrated in FIG. 13 and where the features are similar, the same reference numerals are used. FIG. 14 also illustrates the Cartesian coordinate system 18.

The thirteenth flexible tool 113 differs from the twelfth flexible tool 112 in that the third and fourth flexible joints 1613, 1614 are relatively thick in the direction of pivoting (parallel to the X axis 20), and the fifth and sixth flexible joints 1615, 1616 are relatively thin in the direction of pivoting (parallel to the Y axis 22).

The relative thicknesses of the flexible joints in the direction of pivoting provides the thirteenth flexible tool 113 with a variation in bend stiffness along the longitudinal axis 14. In particular, the relatively large width of the first, second, third and fourth flexible joints 1611, 1612, 1613, 1614 in their directions of pivoting causes the thirteenth flexible tool 113 to have relatively high stiffness between the first, second and third rigid members 121, 122, 123. The relatively small width of the fifth, sixth, seventh and eighth flexible joints 1615, 1616, 1617, 1618 in their directions of pivoting causes the thirteenth flexible tool 113 to have relatively low stiffness between the third, fourth and fifth rigid members 123, 124, 125.

The thirteenth flexible tool 113 may be incorporated into another flexible tool (as described in the present patent application) to provide that flexible tool with a variation in bend stiffness along the longitudinal axis 14. For example, the thirteenth flexible tool 113 may be incorporated into the base section of another flexible tool (that is, the part of the flexible tool that is closest to the actuator) to provide that flexible tool with greater stiffness at its base.

Figure 15:
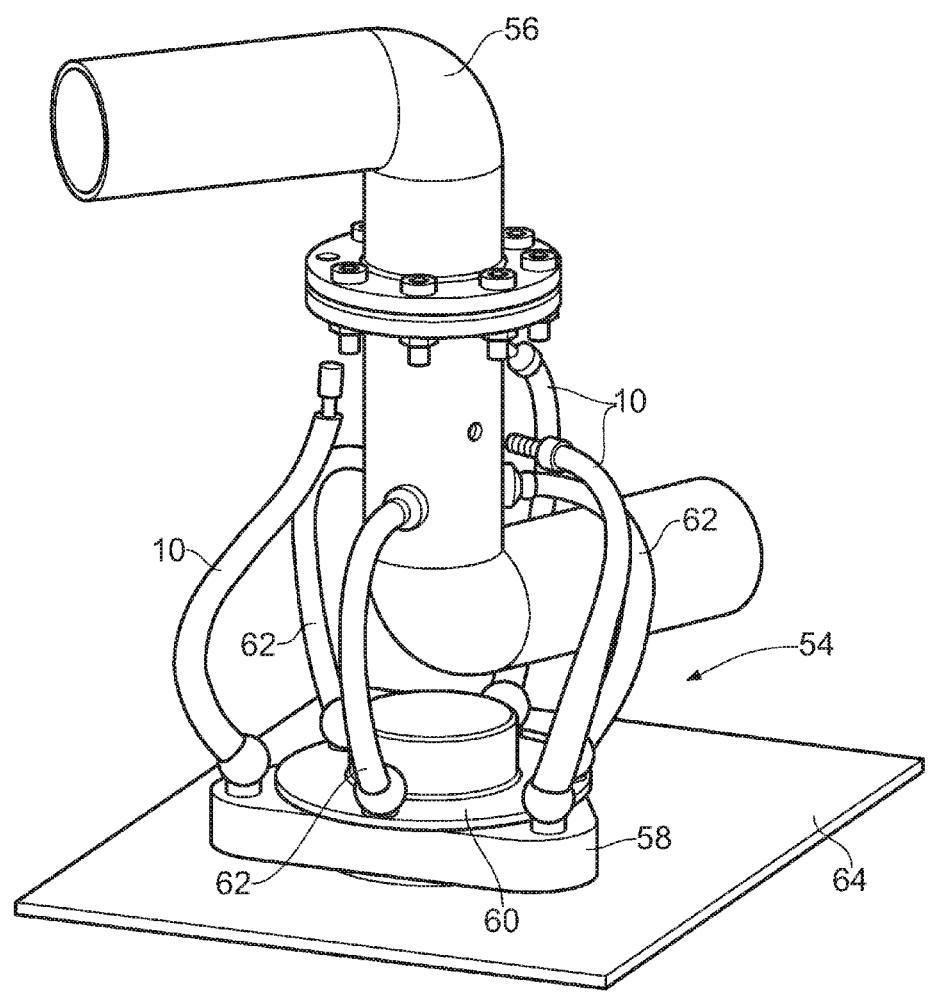
FIG. 15 illustrates a perspective view of apparatus for machining an object according to various examples.

FIG. 15 illustrates a perspective view of apparatus 54 for machining an object 56 according to various examples. The apparatus 54 includes a first base 58; a second base 60, a plurality of flexible tools 10 and a plurality of support members 62.

The object 56 may be any object that requires servicing and maintenance, machining or inspection. As illustrated in FIG. 15, the object 56 comprises two sections of piping that are joined together at their end flanges by a set of nuts and bolts. In other examples, the object 56 may be any component of a gas turbine engine or any component of any other mechanical system.

The plurality of flexible tools 10 are mounted on the first base 58 and the plurality of support members 62 are mounted on the second base 60. The first base 58 and the second base 60 are rotatably coupled to one another (and both may also be rotatably coupled to a fixed third base 64) to enable re-positioning of the plurality of flexible tools 10 and/or the plurality of support members 62. The first base 58 and/or the second base 60 may be rotated by any suitable device (such as a servo motor).

The support members 62 are arranged to support the object 56 relative to the first and second bases 58, 60. For example, the support members 62 may comprise fasteners at their ends to hold the object 56 in space above the first and second bases 58, 60. The support members 62 may comprise any suitable structure and may be one or more of the flexible tools 10, 101, 102, 103, 104, 105, 106, 107, 108, 109, 110, 111, 112, 113 described above. In some examples, the apparatus 54 may only comprise a single support member 62.

The plurality of flexible tools 10 are arranged to service and/or maintain and/or inspect and/or machine the object 56. For example, the flexible tools 10 may comprise drills, sockets and imaging devices at their ends to machine and inspect the object 56 while the object 56 is being held by the support members 62. The plurality of flexible tools 10 may be one or more of the flexible tools 10, 101, 102, 103, 104, 105, 106, 107, 108, 109, 110, 111, 112, 113 described above. In some examples, the apparatus 54 may only comprise a single flexible tool 10.

Figure 16:
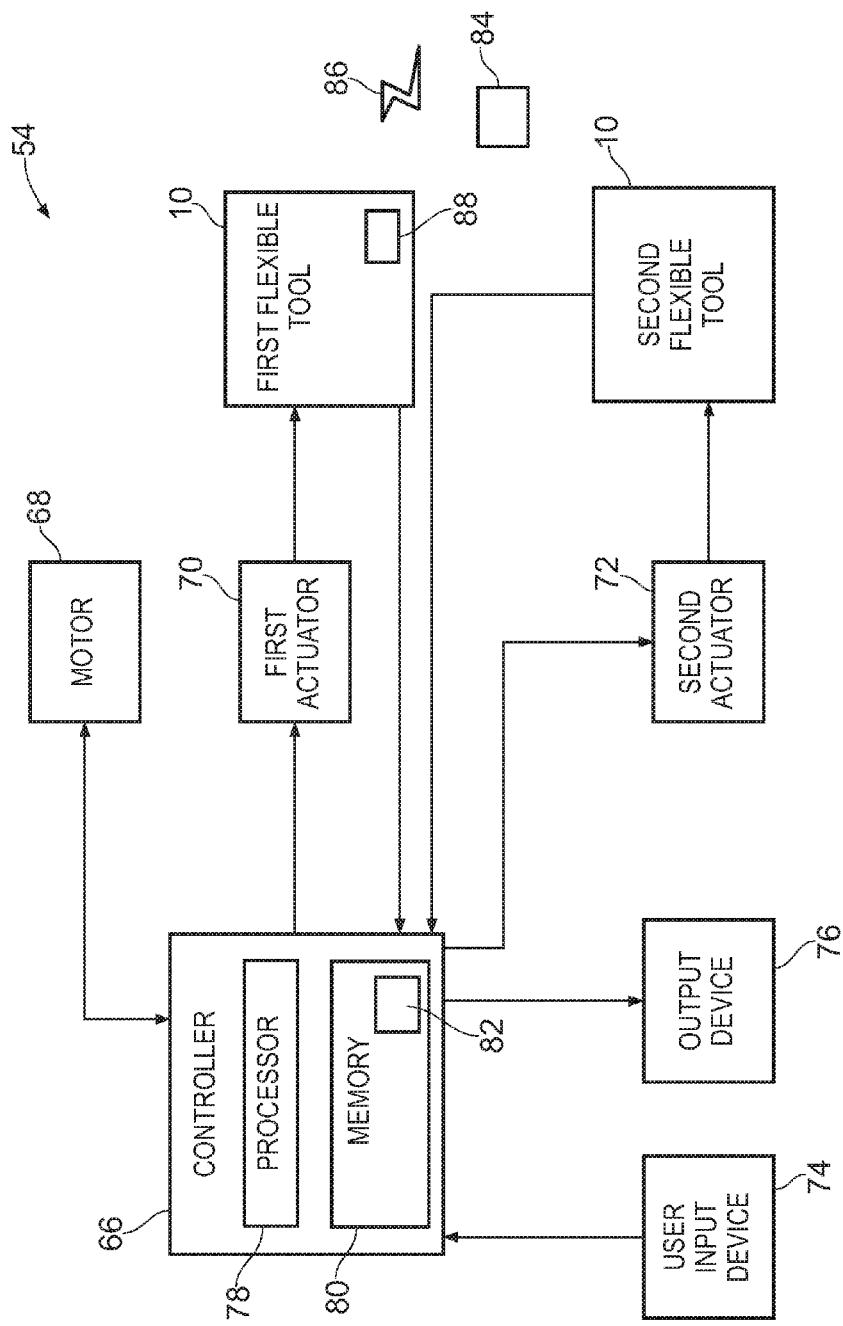
FIG. 16 illustrates a schematic diagram the apparatus illustrated in FIG. 15.

FIG. 16 illustrates a schematic diagram of the apparatus 54 including a controller 66, a motor 68, a first actuator 70, a first flexible tool 10, a second actuator 72, a second flexible tool 10, a user input device 74 and an output device 76. In some examples, the apparatus 54 may be a module. As used herein, the wording 'module' refers to a device or apparatus where one or more features are included at a later time, and possibly, by another manufacturer or by an end user. For example, where the apparatus 54 is a module, the apparatus 54 may only include the controller 66, and the remaining features may be added by another manufacturer, or by an end user.

The controller 66 may comprise any suitable circuitry to cause performance of the methods described herein. The controller 66 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller, to perform the methods.

By way of an example, the controller 66 may comprise at least one processor 78 and at least one memory 80. The memory 80 stores a computer program 82 comprising computer readable instructions that, when read by the processor 78, causes performance of the methods described herein. The computer program 82 may be software or firmware, or may be a combination of software and firmware.

The processor 78 may be located with the components illustrated in FIG. 15, or may be located remote from the components illustrated in FIG. 15, or may be distributed between the components illustrated in FIG. 15 and a location remote from those components. The processor 78 may include at least one microprocessor and may comprise a single core processor, or may comprise multiple processor cores (such as a dual core processor or a quad core processor).

The memory 80 may be located with the components illustrated in FIG. 15, or may be located remote from the components illustrated in FIG. 15, or may be distributed between the components illustrated in FIG. 15 and a location remote from those components. The memory 80 may be any suitable non-transitory computer readable storage medium, data storage device or devices, and may comprise a hard disk and/or solid state memory (such as flash memory). The memory 80 may be permanent non-removable memory, or may be removable memory (such as a universal serial bus (USB) flash drive).

The computer program 82 may be stored on a non-transitory computer readable storage medium 84. The computer program 82 may be transferred from the non-transitory computer readable storage medium 84 to the memory 80. The non-transitory computer readable storage medium 84 may be, for example, a USB flash drive, a compact disc (CD), a digital versatile disc (DVD) or a Blu-ray disc. In some examples, the computer program 82 may be transferred to the memory 80 via a wireless signal 86 or via a wired signal 86.

The first actuator 70 may be any suitable device or apparatus to control movement of the first flexible tool 10. For example, the first actuator 70 may comprise a plurality of servomotors that are coupled to the control cables of the first flexible tool 10 and are configured to move the control cables to control the movement of the first flexible tool. The controller 66 is configured to provide a control signal to the first actuator 70 to cause the first actuator 70 to move the first flexible tool 10.

As described above with reference to FIG. 15, the first flexible tool 10 may be any one, or combination of, the flexible tools 10, 101, 102, 103, 104, 105, 106, 107, 108, 109, 110, 111, 112, 113. The first flexible tool 10 comprises a sensor 88 to sense a parameter internal to the first flexible tool 10 (such as orientation of the first flexible tool 10) or external to the first flexible tool 10 (such as proximity of an object to the first flexible tool 10). The sensor 88 may be any suitable device and may comprise imaging apparatus (such as a charge coupled device camera or a complementary metal oxide sensor) or proximity sensing apparatus (such an ultrasound emitter and detector).

The second actuator 72 may be any suitable device or apparatus to control movement of the second flexible tool 10. For example, the second actuator 72 may comprise a plurality of servomotors that are coupled to the control cables of the second flexible tool 10 and are configured to move the control cables to control the movement of the second flexible tool 10. The controller 66 is configured to provide a control signal to the second actuator 72 to cause the first second 72 to move the second flexible tool 10.

The user input device 74 may be any suitable device that provides a human machine interface (HMI). For example, the user input device 74 may comprise one or more of: a touchscreen display, a keyboard, a keypad, a computer mouse, a touchpad and so on. The controller 66 is configured to receive user input signals from the user input device 74. For example, a user may operate the user input device 74 to control the movement of the first and/or second flexible tool 10 to inspect or machine the object 56.

The output device 76 may be any suitable device for conveying information to a user. For example, the output device 76 may be a display (such as a liquid crystal display, or a light emitting diode display, or an active matrix organic light emitting diode display, or a thin film transistor display, or a cathode ray tube display) and/or a loudspeaker. The controller 66 is arranged to provide a signal to the output device 46 to cause the output device 46 to convey information to the user. For example, the controller 66 may receive image data from the sensor 88 of the first flexible tool 10 and then control the output device 76 to display the image to the operator.

The controller 66 is configured to determine the relative positions of the first flexible tool 10 and the second flexible tool 10 and to control the movement of the first flexible tool 10 and/or the second flexible tool 10 to avoid collision therebetween. For example, the controller 66 may update a database stored in the memory 80 with position coordinates of the first flexible tool 10 and the second flexible tool 10. Where movement of the first flexible tool 10 and/or the second flexible tool 10 results in an overlap of the position coordinates, the controller 66 does not send control signals to the first flexible tool and/or the second flexible tool to prevent the collision. By way of another example, the controller 66 may receive image data and/or proximity data from the sensor 88 of the first flexible tool 10 and where the first flexible tool 10 and the second flexible tool 10 are positioned within a threshold distance of one another, the controller 66 may not send any control signals to the first actuator 70 and/or the second actuator 72 that would result in the first flexible tool and the second flexible tool getting closer to one another.

It will be understood that the flexible tool and apparatus are not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A flexible tool having a first end and a second end, the flexible tool comprising:
   a plurality of rigid members spaced along a longitudinal axis of the flexible tool, which extends from the first end to the second end; and
   a plurality of flexible members extending between the plurality of rigid members, the plurality of flexible members including: (i) a plurality of control cables extending through at least some of the plurality of rigid members, and (ii) a plurality of flexible joints extending between adjacent rigid members of the plurality of rigid members, the plurality of flexible members being arranged to enable the plurality of rigid members to diverge from the longitudinal axis and define a work volume for the flexible tool, at least some of the plurality of flexible members being unevenly spaced around the longitudinal axis, or a physical characteristic of at least some of the plurality of flexible members varying along the longitudinal axis, to cause the work volume or stiffness of the flexible tool to be asymmetric relative to the longitudinal axis as the flexible tool extends from the first end to the second end.

2. The flexible tool as claimed in claim 1, wherein the plurality of control cables includes a first control cable, a second control cable, and a third control cable extending between at least two adjacent rigid members, the second control cable being positioned between the first control cable and the third control cable, a distance between the first control cable and the second control cable being less than a distance between the second control cable and the third control cable.

3. The flexible tool as claimed in claim 1, wherein the plurality of control cables includes at least one control cable positioned at a greater radial distance from the longitudinal axis than the other control cables of the plurality of control cables.

4. The flexible tool as claimed in claim 1, wherein the plurality of flexible joints includes a first flexible joint, a second flexible joint and a third flexible joint, the second flexible joint being positioned between the first flexible joint and the third flexible joint, a distance between the first flexible joint and the second flexible joint being less than a distance between the second flexible joint and the third flexible joint.

5. The flexible tool as claimed in claim 1, wherein two flexible joints of the plurality of flexible joints extend between two adjacent rigid members and define a pivot axis between the two adjacent rigid members, the pivot axis non-intersecting with the longitudinal axis.

6. The flexible tool as claimed in claim 1, wherein:
   the plurality of rigid members includes a first rigid member, a second rigid member and a third rigid member, the second rigid member being positioned between the first rigid member and the third rigid member, and
   the plurality of flexible joints includes a first subset of flexible joints extending between the first rigid member and the second rigid member, and a second subset of flexible joints extending between the second rigid member and the third rigid member, the first subset of flexible joints and the second subset of flexible joints overlaying one another when viewed along the longitudinal axis.

7. The flexible tool as claimed in claim 1, wherein the physical characteristic of the plurality of flexible members includes a length of the plurality of flexible members between adjacent rigid members.

8. The flexible tool as claimed in claim 1, wherein the physical characteristic of the plurality of flexible members includes a thickness of the plurality of flexible members.

9. The flexible tool as claimed in claim 1, wherein the physical characteristic of the plurality of flexible members is defined as a material that forms the plurality of flexible members.

10. An apparatus for machining an object, the apparatus comprising:
    a first flexible tool defined as the flexible tool as claimed in claim 1.

11. The apparatus as claimed in claim 10, further comprising:
    a first base; and
    a second base, the first base and the second base being rotatably coupled to one another, wherein
      the first flexible tool as claimed in claim 1 is mounted on the first base.

12. The apparatus as claimed in claim 11, further comprising:
    at least one support member configured to support the object, the at least one support member being mounted on the second base.

13. The apparatus as claimed in claim 10, further comprising:
    a second flexible tool; and
    a controller configured to:
       determine relative positions of the first flexible tool and the second flexible tool; and
       control movement of the first flexible tool or the second flexible tool to avoid collision between the first flexible tool and the second flexible tool.

14. A flexible tool having a first end and a second end, the flexible tool comprising:
    a plurality of rigid members spaced along a longitudinal axis of the flexible tool, which extends from the first end to the second end; and
    a plurality of flexible members extending between the plurality of rigid members, the plurality of flexible members including sets of at least two of the plurality of flexible members extending between adjacent rigid members of the plurality of rigid members, each set of the at least two of the plurality of flexible members being evenly spaced apart around the longitudinal axis, the plurality of flexible members being arranged to enable the plurality of rigid members to diverge from the longitudinal axis and define a work volume for the flexible tool by each of the sets of the at least two of the plurality of flexible members progressively increasing in distance from the longitudinal axis from the first end towards the second end of the flexible tool to cause the work volume or stiffness of the flexible tool to be asymmetric relative to the longitudinal axis as the flexible tool extends from the first end to the second end.

15. A flexible tool having a first end and a second end, the flexible tool comprising:
    a plurality of rigid members spaced along a longitudinal axis of the flexible tool, which extends from the first end to the second end; and
    a plurality of flexible members extending between the plurality of rigid members, the plurality of flexible members including sets of at least two of the plurality of flexible members extending between adjacent rigid members of the plurality of rigid members, each set of the at least two of the plurality of flexible members being evenly spaced apart around the longitudinal axis, the plurality of flexible members being arranged to enable the plurality of rigid members to diverge from the longitudinal axis and define a work volume for the flexible tool by each of the sets of the at least two of the plurality of flexible members progressively changing a physical characteristic of the at least two of the plurality of flexible members in each set along the longitudinal axis from the first end towards the second end of the flexible tool to cause the work volume or stiffness of the flexible tool to be asymmetric relative to the longitudinal axis as the flexible tool extends from the first end to the second end.

\* \* \* \* \*